United States Patent [19]

Watanabe et al.

[11] Patent Number: 5,407,639
[45] Date of Patent: Apr. 18, 1995

[54] METHOD OF MANUFACTURING A CORONA DISCHARGE DEVICE

[75] Inventors: Toshiya Watanabe; Yuji Aso; Eiichi Kojima; Yoshihide Hayashida, all of Kanagawa, Japan

[73] Assignee: Toto, Ltd., Fukuoka, Japan

[21] Appl. No.: 953,356

[22] Filed: Sep. 30, 1992

[30] Foreign Application Priority Data

Oct. 14, 1991 [JP] Japan .............................. 3-091833 U
Feb. 28, 1992 [JP] Japan .................................. 4-078863

[51] Int. Cl.$^6$ ...................... C01B 13/11; H01T 23/00
[52] U.S. Cl. .............................. 422/186.07; 422/186; 422/186.04; 250/324; 250/326; 361/230; 361/233
[58] Field of Search ............. 422/186, 186.04, 186.07; 250/324, 326; 361/230, 233; 346/159

[56] References Cited

U.S. PATENT DOCUMENTS

| Re. 33,633 | 7/1991 | Hosono et al. ................ 361/213 |
|---|---|---|
| 4,545,960 | 10/1985 | Erz et al. ..................... 422/186.12 |
| 4,626,876 | 12/1986 | Miyagawa et al. ............... 346/160 |
| 4,626,876 | 12/1986 | Miyagawa et al. ............... 346/160 |
| 4,652,318 | 3/1987 | Masuda et al. ..................... 156/89 |
| 4,666,679 | 5/1987 | Masuda et al. ................. 422/186.2 |
| 4,672,503 | 6/1987 | Masuda et al. ..................... 361/230 |
| 4,690,803 | 9/1987 | Hirth ............................. 422/186.18 |
| 4,783,716 | 11/1988 | Nagase et al. ..................... 361/225 |
| 4,783,716 | 11/1988 | Nagase et al. ..................... 361/225 |
| 4,794,254 | 12/1988 | Genouese et al. ................ 250/324 |
| 4,811,158 | 3/1989 | Kani et al. ..................... 361/230 |
| 4,892,713 | 1/1990 | Newman ....................... 422/186.07 |
| 4,940,894 | 7/1990 | Morters ........................... 250/324 |
| 4,975,579 | 12/1990 | Iwanaga ......................... 250/324 |
| 4,985,716 | 1/1991 | Hosaka et al. ..................... 346/159 |
| 5,027,136 | 6/1991 | Fotland et al. ..................... 346/159 |
| 5,043,579 | 8/1991 | Gundlach et al. ................. 250/325 |
| 5,087,426 | 2/1992 | Inoue et al. ..................... 422/123 |
| 5,154,895 | 10/1992 | Moon ............................. 422/186.07 |
| 5,272,414 | 12/1993 | Iwanaga ......................... 313/631 |

FOREIGN PATENT DOCUMENTS

| 58-108559 | 6/1983 | Japan . |
|---|---|---|
| 60-157183 | 8/1985 | Japan . |
| 61-231573 | 10/1986 | Japan . |
| 62-51463 | 3/1987 | Japan . |
| 64-33004 | 2/1989 | Japan . |
| 1-128822 | 9/1989 | Japan . |
| 1-246104 | 10/1989 | Japan . |
| 3-190077 | 8/1991 | Japan . |

*Primary Examiner*—Donald P. Walsh
*Assistant Examiner*—Daniel Jenkins
*Attorney, Agent, or Firm*—Lowe, Price, LeBlanc and Becker

[57] ABSTRACT

A method of manufacturing a corona discharge device suitable for use as an ozonizer capable of producing a controlled small amount of ozone throughout a prolonged service life. A foreproduct of corona discharge device (50) is first prepared which is provided with first and second planar electrodes (54; 56) capacitively coupled with each other by a third floating electrode (64) which is coated by a protective layer (68) of chemically-resistive electrically-insulating material. A high frequency alternating voltage having a voltage level higher than an initial minimum flashover voltage level of the foreproduct is then applied until the protective layer is aged. Aging of the protective layer is effective in lowering the initial minimum flashover voltage of the final product thus obtained as well as in reducing any fluctuation of the initial minimum flashover voltage that would otherwise occur from product to product. Various other features are also disclosed.

15 Claims, 18 Drawing Sheets

NON-AGED PRODUCT

COMPARATIVE EXAMPLE

AGED AT 7kVpp FOR 3 sec

AGED AT 7kVpp FOR 30 sec

AGED AT 7kVpp FOR 300 sec

AGED AT 8kVpp FOR 30 sec

AGED AT 8kVpp FOR 120 sec

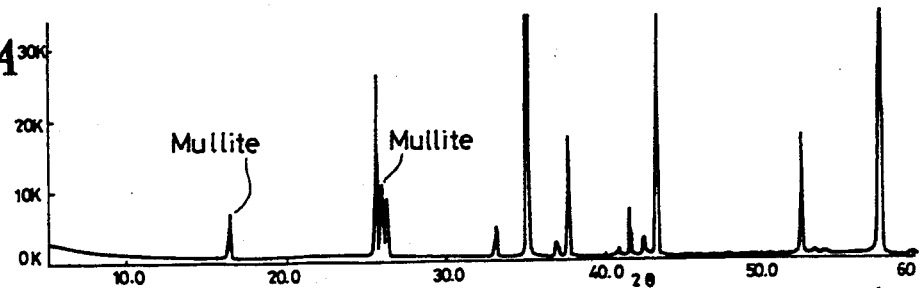
FIG. 19A CaO 0.5 wt%
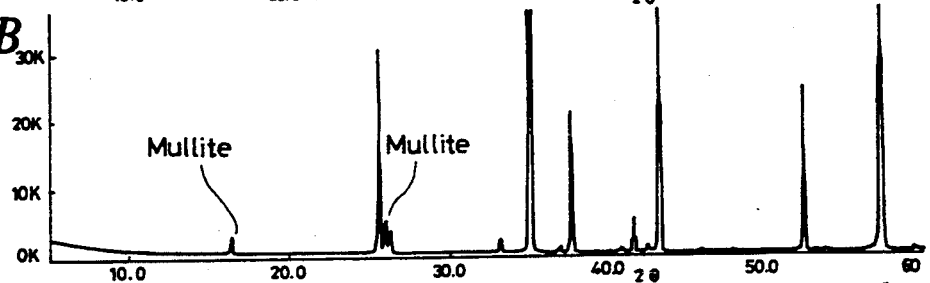
FIG. 19B CaO 0.8 wt%
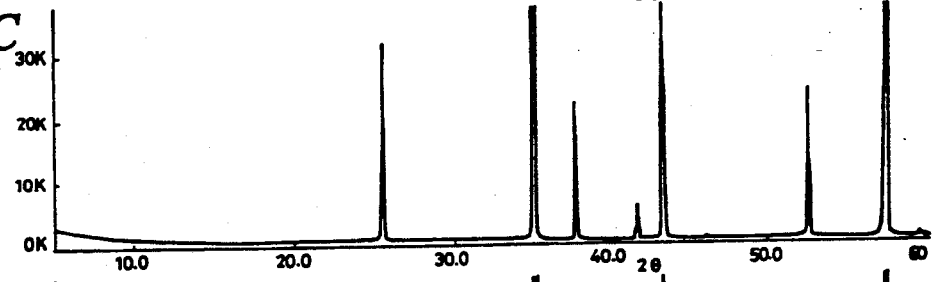
FIG. 19C CaO 1.0 wt%
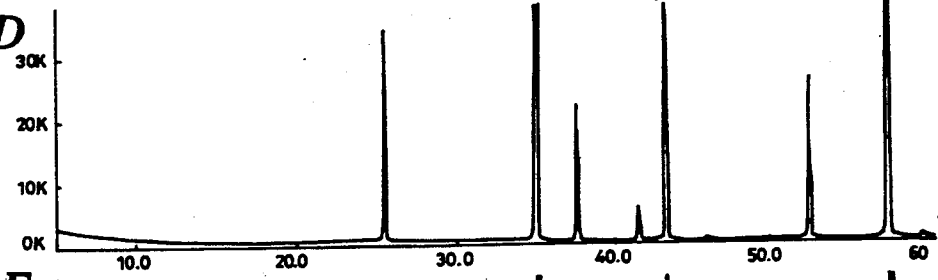
FIG. 19D CaO 1.2 wt%
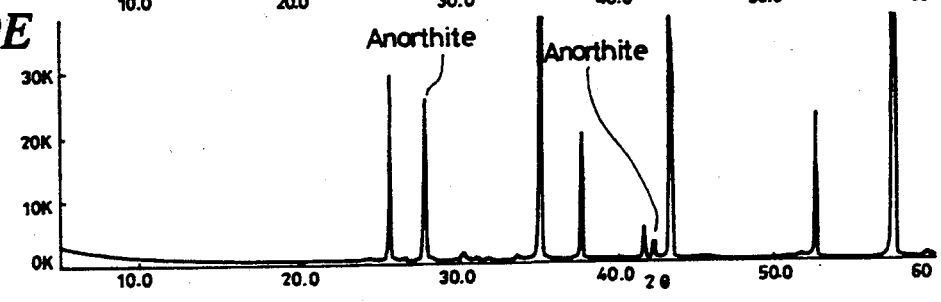
FIG. 19E CaO 1.5 wt%

CaO 1.0%

CaO 0.5%

METHOD OF MANUFACTURING A CORONA DISCHARGE DEVICE

BACKGROUND OF THE INVENTION

1. Field of the Invention

The present invention relates to a method of manufacturing a corona discharge device which may suitably be used as an ozonizer for deodorization of ambient air bearing malodorous substances.

2. Description of the Prior Art

To provide ease and comfort of living spaces, such as lavatories, wherein sources of offensive smell are present, various deodorization techniques have been used to remove unfavorable smell from the ambient atmosphere.

Conventional deodorization techniques typically include the use of ozone generators which are commonly referred-to in the art as ozonizers. In many instances, an ozonizer is preferably used in combination with an ozone decomposer catalyst, as described, for example, in Japanese Utility Model Kokai Publication No. 1-128822(1989). More specifically, an ozonizer is placed in an air passage of a deodorizer equipment through which ambient air containing malodorous substances is circulated by a fan. A high frequency alternating voltage is applied to the ozonizer to develop corona discharge across an air gap thereof whereby ozone is artificially produced. The air-borne malodorants as well as ozone generated by the ozonizer are forced to contact with the ozone decomposer catalyst, such as $TiO_2$ and MnO, carried by a porous catalyst support formed, for example, in a honeycomb structure. Conveniently, the extended surface area of the ozone decomposing catalyst serves to effectively capture the malodorants thereon. The catalyst functions to decompose ozone into oxygen molecules and active oxygen atoms. The active oxygen, in turn, reacts with the malodorants captured on the catalyst surface to oxidize them into odorless or less malodorous substances. As an example, when malodorant is $H_2S$, chemical reaction of deodorization takes place as follows.

$$H_2S + 3O_3 \rightarrow SO_2 + H_2O \cdot 3O_2$$

The flow of air treated in this manner by the deodorizer equipment is then discharged into the ambient atmosphere.

Since ozone is toxic and has a unique stimulative smell, it is desirable that treated air leaving the deodorizer apparatus be ozone free. In this regard, an important function of the conventional ozone decomposer catalyst is to decompose any excessive amount of ozone into harmless oxygen in the following manner.

$$2O_3 \rightarrow 3O_2$$

However, it has been recognized that, because the amount of ozone decomposer catalyst filled in the currently available deodorizer equipment is limited due to the size thereof, the overall efficiency of the ozone decomposer catalyst generally does not exceed about 90%, with a result that about 10% of ozone produced by the ozonizer is unavoidably released into the atmosphere without being decomposed.

The present inventors have observed that about 0.02 ppm of ozone contained in a flow of air flowing at a flow rate of 100 liters per minute may be sensed by human respiratory organs. Assuming that the efficiency of the ozone decomposer catalyst is 90%, it follows that, desirably, an ozonizer should not generate ozone at a production rate greater than about as small as 0.2 ppm for air flowing at a flow rate of 100 liters per minute.

Another requirement for the deodorizing ozonizer is that such a limited ozone generating capability must be sustained for years in order to adequately deodorize the environment throughout the service life of the ozonizer.

In short, the problem which must be overcome in designing an ozonizer for deodorizer applications is to ensure that a controlled, small amount of ozone is generated constantly for a prolonged period of time.

Various types of the prior art ozonizers will be briefly discussed below. It is known in the art that the principle of operation of an ozonizer, wherein ozone is artificially produced, is found in the "Siemens Tube" developed in as early as 1857. This device is provided with a double-walled glass tube forming an annular air passage through which dry air or oxygen under atmospheric pressure is circulated. An inner electrode is provided at the center of the glass tube and an outer casing surrounding the tube serves as an outer electrode. When an alternating high voltage is applied between the inner and outer electrodes, silent electric discharge which is otherwise known as corona discharge is developed across the air passage whereby oxygen is converted into ozone. In the Siemens Tube, corona discharge is spread over the inner surfaces of the glass tube and this phenomenon is known in the art as surface creepage or surface flashover. It is said that such flashover is due to the presence of the glass tube which acts as an insulating barrier between electrodes to cause electric discharge columns, which in actuality are streams or avalanches of electrons, to be distributed over the surfaces of the glass tube.

Recent ozonizers are made generally by using manufacturing techniques of solid state devices and have one or more planar electrodes but operate on as much the same principle as the Siemens Tube.

For example, Japanese Patent Kokai Publication No. 61-231573(1983) and FIG. 2 of Japanese Patent Kokai Publication No. 60-157183(1985) describe corona discharge devices or ozonizers of the opposed electrode type, a cross-section of which is reproduced schematically in FIG. 1 of the drawings accompanying the present application. As shown therein, an inner planar electrode 10 is embedded in a substrate 12 of dielectric ceramic material and an outer electrode 14 is formed on the surface of the substrate by metallizing techniques such as tungsten paste printing. As a high frequency alternating voltage is applied between the electrodes by a power source 16, an electric field is developed across the dielectric layer. In FIG. 1, the direction of the electric field is shown by the lines of electric force indicated by the broken lines 18, the lines of electric force being perpendicular to the equipotential surfaces indicated by the fine solid lines 20. It will be noted that, because the outer electrode 14 is narrower than the inner electrode 10, the equipotential surfaces 20 are flared upwardly so as to cause part of the electric field to be developed across the air gap. When at any point of time the electric potential applied across the air gap exceeds the breakdown voltage thereof, breakdown of the air gap takes place thereby resulting in electric discharge occurring along the lines of electric force as schematically illustrated in FIG. 1 by the bold lines 22. Corona discharge is observed as a crowd of discharge columns of such individual discrete electric discharge occurring consecutively. Such corona discharge is spread to a certain extent over the surface of the dielectric substrate due to the surface creepage or flashover mentioned hereinbefore.

The disadvantage of the ozonizer of the opposed electrode type as reproduced in FIG. 1 is that it is difficult to provide a durable and reliable electrical connection to the outer electrode 14. Thus, one of the lead wires from the power source 16 must necessarily be arranged to extend above the outer electrode, with an end thereof soldered to the upper surface of the outer electrode. As the lead wire as well as the soldered end are arranged in this manner in an ozone enriched region, there is a risk that they are readily degraded due to oxidation. The outer electrode is also subjected to the attack by ozone.

Japanese Patent Kokai Publication Nos. 64-33004(1989) and 1-246104(1989) disclose an ozonizer of the opposed electrode type wherein the outer electrode is covered by a protective coating. While the ceramic coating protects the outer electrode from oxidation, this arrangement still suffers from the disadvantage of degradation of lead wire and soldered connection.

Japanese Patent Kokai Publication No. 58-108559(1983) and U.S. Pat. No. 4,783,716 describe a discharge device having a pair of inner planar electrodes juxtaposed in a side-by-side arrangement in a dielectric layer. The cross-sectional representation thereof is schematically reproduced in FIG. 2 hereof. Advantageously, this juxtaposed electrode arrangement enables to position all the lead wires at the lower side of the device remote from the ozone rich region. Therefore, the lead wires are exempt from chemical attack by ozone. It seems, however, that this discharge device has not been commercialized. Presumably, this is because of failure to produce an adequate amount of ozone. It is believed that, since the electric field developed between the juxtaposed electrodes 24 and 26 is mostly confined within the dielectric layer as illustrated in FIG. 2, it is difficult to develop across the air gap an electric field strong enough to generate intensive corona discharge.

Japanese Patent Kokai Publication No. 60-157183(1985) discloses in FIGS. 4–8 thereof a solid state discharge device having an additional floating electrode overlying a pair of juxtaposed inner electrodes to which an alternating voltage is applied. Similar device is disclosed in FIGS. 3–13 of Japanese Patent Kokai Publication No. 62-51463(1987) and FIGS. 1–4 of Japanese Patent Kokai Publication No. 3-190077(1991). For ready reference, a cross-sectional schematic view of these devices is reproduced in FIG. 3 of the present application. It will be understood from FIG. 3 hereof that the intermediate floating electrode 28 functions to capacitively couple the inner juxtaposed electrodes 30 and 32 with each other. Accordingly, as compared with the arrangement illustrated in FIG. 2, the presence of the floating electrode 28 contributes to raise the lines of electric force toward the air gap, thereby provoking more intensive corona discharge between the electrodes 28 and 30, in the one place, and between the electrodes 28 and 32, in the other place.

According to testings and investigations of the present inventors, however, it has been observed that the amount of ozone produced therein decreases rapidly as time elapses. The outer floating electrode 28 is readily oxidized because it is subjected not only to chemical attack by ozone which is generated but also to electrical attack by corona discharge. In addition, the floating electrode is damaged by sputtering due to ion bombardment. As a result, the electric resistance of the floating electrode becomes increased as the device is operated. Accordingly, the minimum voltage level necessary to trigger corona discharge becomes increased in response to the lapse of time, as described later in more detail with reference to the test results indicated in the accompanying drawings. This means that, when the ozonizer is to be operated at a predetermined operating voltage, the intensity of corona discharge will slide down so that the ozonizer will finally fail to produce required amount of ozone.

Accordingly, an object of the present invention is to provide an improved corona discharge device.

Another object of the invention is to provide a corona discharge device for use as an ozonizer, wherein ozone is generated at a constant rate for an extended period of time.

A still another object of the invention is to provide a corona discharge device which is capable of producing a controlled small amount of ozone throughout a prolonged service life.

A further object of the invention is to provide a method by which high quality corona discharge devices are manufactured on a mass production basis.

SUMMARY OF THE INVENTION

The present invention is based on several findings and discoveries related to a protective coating for the floating electrode which are as follows.

The present inventors have attempted to protect the floating electrode from the above-mentioned sputtering and oxidation. To this end, a plurality of identical experimental examples of corona discharge device each having a floating electrode coated by a protective layer of ceramic material have been prepared. While operating, these examples have been tested to see how the minimum flashover voltage thereof will vary as a function of total time of operation. The term "minimum flashover voltage" as used herein and in the appended claims is intended to mean the minimumvoltage required to cause the corona discharge device to develop corona discharge across the air gap practically instantaneously upon application of voltage, i.e., without perceptible delay time. Likewise, the term "initial minimum flashover voltage" is defined as being the minimum flashover voltage which is initially observed with an unused, new corona discharge device as fabricated. Measurement of the minimum flashover voltage has been carried out in such a manner that the voltage level of a high frequency alternating voltage applied to respective examples is gradually increased until commencement of corona discharge is observed, whereupon the minimum flashover voltage has been determined.

As anticipated, it has been observed that, throughout the tested examples, the initial minimum flashover voltage is considerably higher as compared with that of the device wherein the floating electrode is uncoated as illustrated in FIG. 3. This is partly because the presence of the protective layer prevents supply of electrons from the floating electrode so that, presumably, a considerable delay time is necessary until corona discharge is triggered at a given voltage level.

However, it has been found that the initial minimum flashover voltage varies from example to example to an unexpectedly wide extent. Probably, this is related to the surface roughness of the protective coating. Such a wide fluctuation in the initial minimum flashover voltage is undesirable when corona discharge devices are to be manufactured by mass production techniques and operated at a predetermined equal voltage.

More importantly, the present inventors have discovered that the minimum flashover voltage of the tested examples becomes gradually lowered as a function of the total time of operation. This is in contrast to the conventional corona discharge device wherein the minimum flashover voltage becomes increased in accordance with continued operation as mentioned hereinbefore.

Inspired by this discovery, the present inventors have tentatively applied to the experimental examples a high frequency alternating voltage of a level higher than the initial minimum flashover voltage for the purposes of aging the protective coating by corona discharge. Surprisingly, it has been discovered that the examples having the thus aged protective coating have exhibited the initial minimum flashover voltage fluctuation which is much narrower than that observed with the non-aged examples. Furthermore, it has been found that the initial minimum flashover voltage is considerably lowered as a result of aging.

Based on these discoveries, the present invention provides a method of manufacturing a corona discharge device for use as ozonizer. According to the invention, a foreproduct of corona discharge device is prepared which is provided with a pair of spaced planar inner electrodes embedded in a substrate of dielectric material such as alumina ceramics. The foreproduct further includes an outer floating electrode disposed on the substrate. The floating electrode is covered by a protective layer of chemically-resistive electrically-insulating material such as alumina ceramics. According to the invention, the protective layer of the thus prepared foreproduct is then aged to obtain a final product of corona discharge device, by applying a high frequency alternating voltage having a voltage level higher than an initial minimum flashover voltage level of the foreproduct.

While the principle and mechanism of aging of the protective layer is not clear, aging is obviously effective in lowering the initial minimum flashover voltage of the final product as well as in reducing the extent of fluctuation of the initial minimum flashover voltage.

Preferably, aging is carried out for more than about 5 seconds, preferably for 10-300 seconds, at a voltage slightly lower than the breakdown voltage of a layer of the dielectric material located between the outer and inner electrodes.

Other features and advantages of the present invention will become apparent from the following description.

BRIEF DESCRIPTION OF THE DRAWINGS

FIG. 19A–19E are graphs showing the results of X-ray diffraction analysis conducted for the dielectric ceramics having varying CaO content;

DESCRIPTION OF THE PREFERRED EMBODIMENTS

Figure 1:
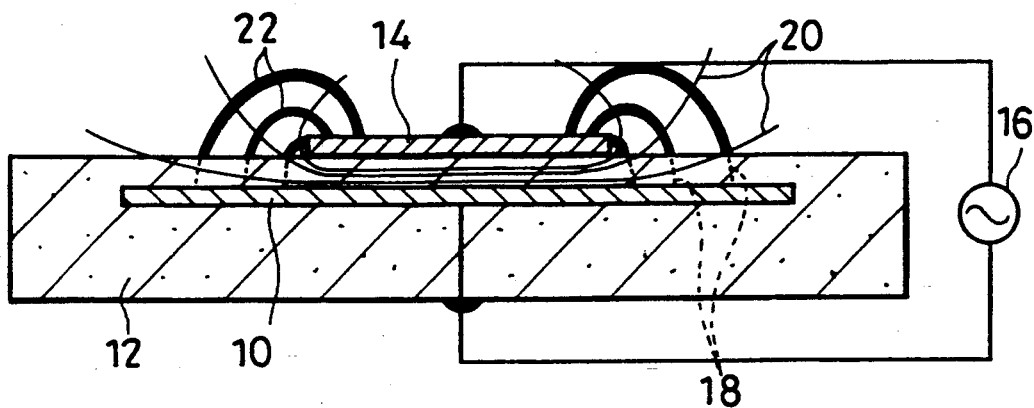
FIGS. 1–3 are schematic cross-sectional representations of various prior art corona discharge devices.
Figure 2:
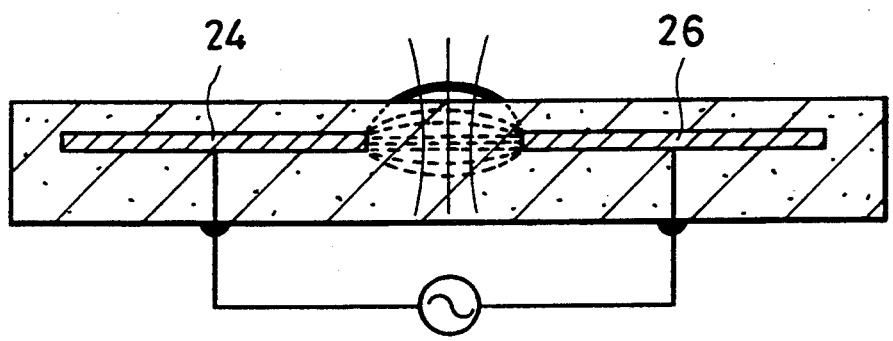
Figure 3:
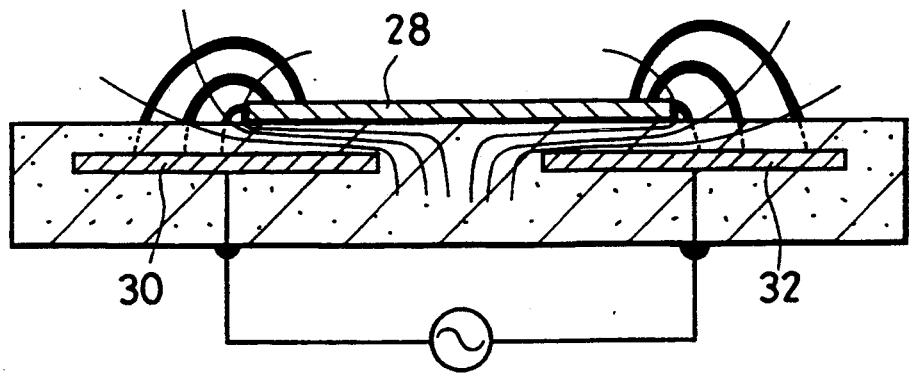
Figure 4:
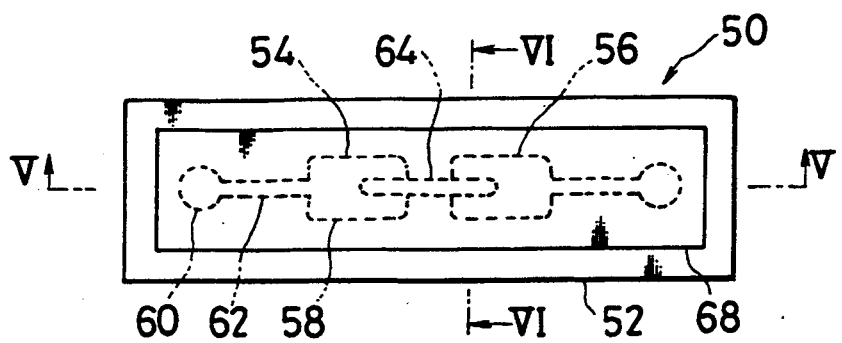
FIG. 4 is a plan view in a slightly enlarged scale showing the corona discharge device manufactured according to the method of the invention.
Figure 5:
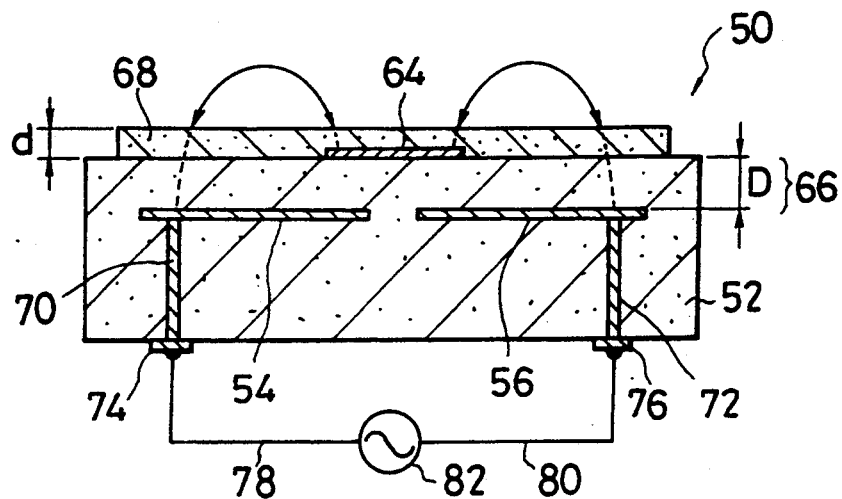
FIG. 5 is a cross-sectional view taken along the line V—V of FIG. 4, with the cross-section being shown greatly exaggerated in the thickwise direction.
Figure 6:
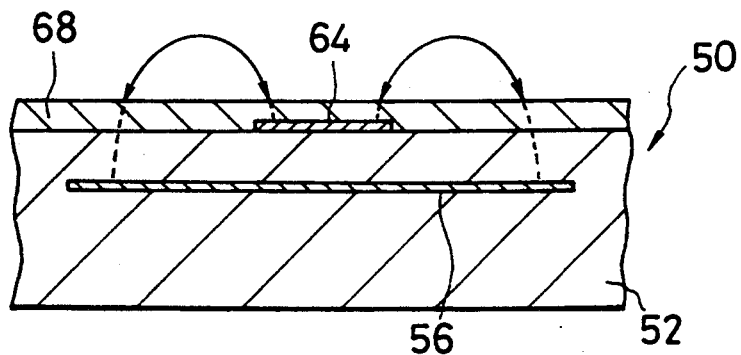
FIG. 6 is a cross-sectional view taken along the line VI—VI of FIG. 4, with the cross-section exaggerated in a greater scale in the lateral direction than in the thickwise direction.
Figure 7:
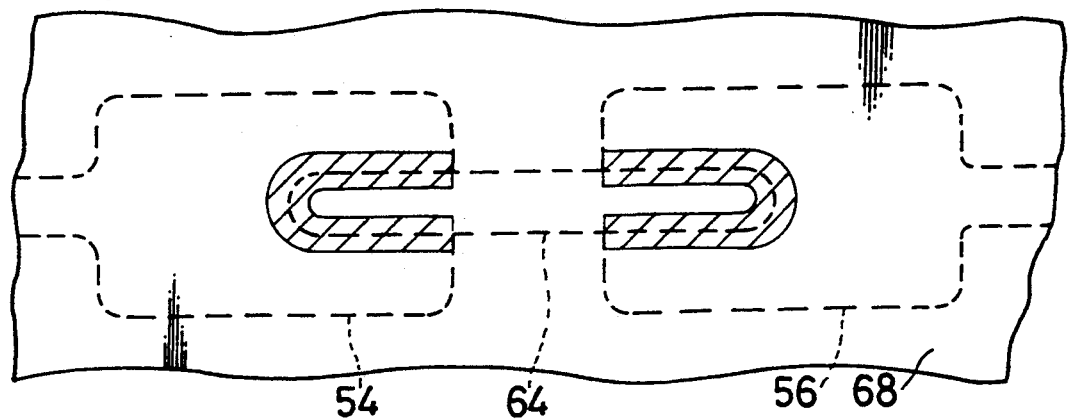
FIG. 7 is a view similar to FIG. 4 but showing portion of the device in a further enlarged scale.

Referring now to FIGS. 4–7, general structure and mode of operation of the corona discharge device according to the invention will be described. As illustrated in FIGS. 4–6, the corona discharge device 50 includes a substrate 52 of dielectric material, such as alumina ceramics, in which a pair of planar inner electrodes 54 and 56 are embedded. Each of the electrodes 54 and 56 has a rectangular inward portion 58 and a circular terminal portion 60 connected with each other by an elongated bridging portion 62. An elongated outer electrode 64 having rounded end corners is arranged on the upper surface of the dielectric substrate 52 in such a manner as to partly overlap the inward sections 58 of the inner electrodes 54 and 56, with a layer 66 of dielectric ceramics sandwiched therebetween. While shown greatly exaggerated in the drawings, the effective thickness D of the dielectric layer 66 is preferably about 25–75 micrometers and is substantially smaller than the horizontal distance between the inner electrodes 54 and 56, which distance is in the order of 1 mm. The outer electrode 64 is covered by a protective coating 68 of chemically-resistive electrically-insulating material, such as alumina ceramics, having an effective thickness d of about 7–20 micrometers.

As shown in FIG. 5, a pair of metal conductors 70 and 72 extend across the ceramic substrate 52 and are electrically connected at the ends thereof to the circular terminal sections 60 of the inner electrodes 54 and 56, respectively. The other ends of respective conductors 70 and 72 are connected to a pair of terminals 74 and 76 provided on the lower surface of the substrate 52.

In use, the corona discharge device 50 may be connected via lead wires 78 and 80 to a conventional power source 82 to apply a high frequency alternating voltage between the inner electrodes 54 and 56, as shown in FIG. 5. As the outer electrode 64 is partly superposed with the inner electrodes 54 and 56, and due to the presence of the dielectric layer 66 therebetween, electric capacitance is established between the outer electrode 64 and the inner electrode 54, in the one place, and between the outer electrode 64 and the inner electrode 56, in the other place, so that the outer electrode 64 functions as a floating electrode which capacitively couples the inner electrodes 54 and 56 together. As a result, an alternating electric field is developed between the floating electrode 64 and the respective inner electrodes 54 and 56 so that corona discharge is generated across the air gap between the floating electrode and the inner electrodes as schematically illustrated in FIGS. 5 and 6 by the arcuated arrows.

Corona discharge will take place along the contour in which the floating electrode 68 is superposed with the inner electrodes 54 and 56. Since the floating electrode is overlapped with the inner electrodes 54 and 56 separately, and because in the illustrated embodiment the end corners of the floating electrode 64 are rounded as shown enlarged in FIG. 7, there are two discrete U-shaped regions along which corona discharge is developed. Due to the presence of the ceramic coating 68, corona discharge creeps or flashes over the surface of the protective coating 68 to a certain extent as shown by the hatched areas in FIG. 7. It will be noted that the amount of ozone generated by the corona discharge device 50 is roughly proportional to the surface area of such surface creepage or flashover and, hence, to the total horizontal length along which the outer electrode 64 is superposed with respect to the inner electrodes 54 and 56. By varying the length of the outer floating electrode 64, the ozone productivity of the corona discharge device 50 may readily be controlled with a high degree of accuracy. Therefore, the corona discharge device 50 according to the invention is capable of generating ozone at a controlled small production rate.

It will also be noted that the rounded corners of the floating electrode 64 advantageously prevent localization of columns of corona discharge. If, otherwise, the ends of the outer electrode 64 were configured to present sharp edges, corona discharge columns would be concentrated on such sharp edges, causing the floating electrode 64 and the protective coating 68 to be prematurely damaged.

Figure 8A:
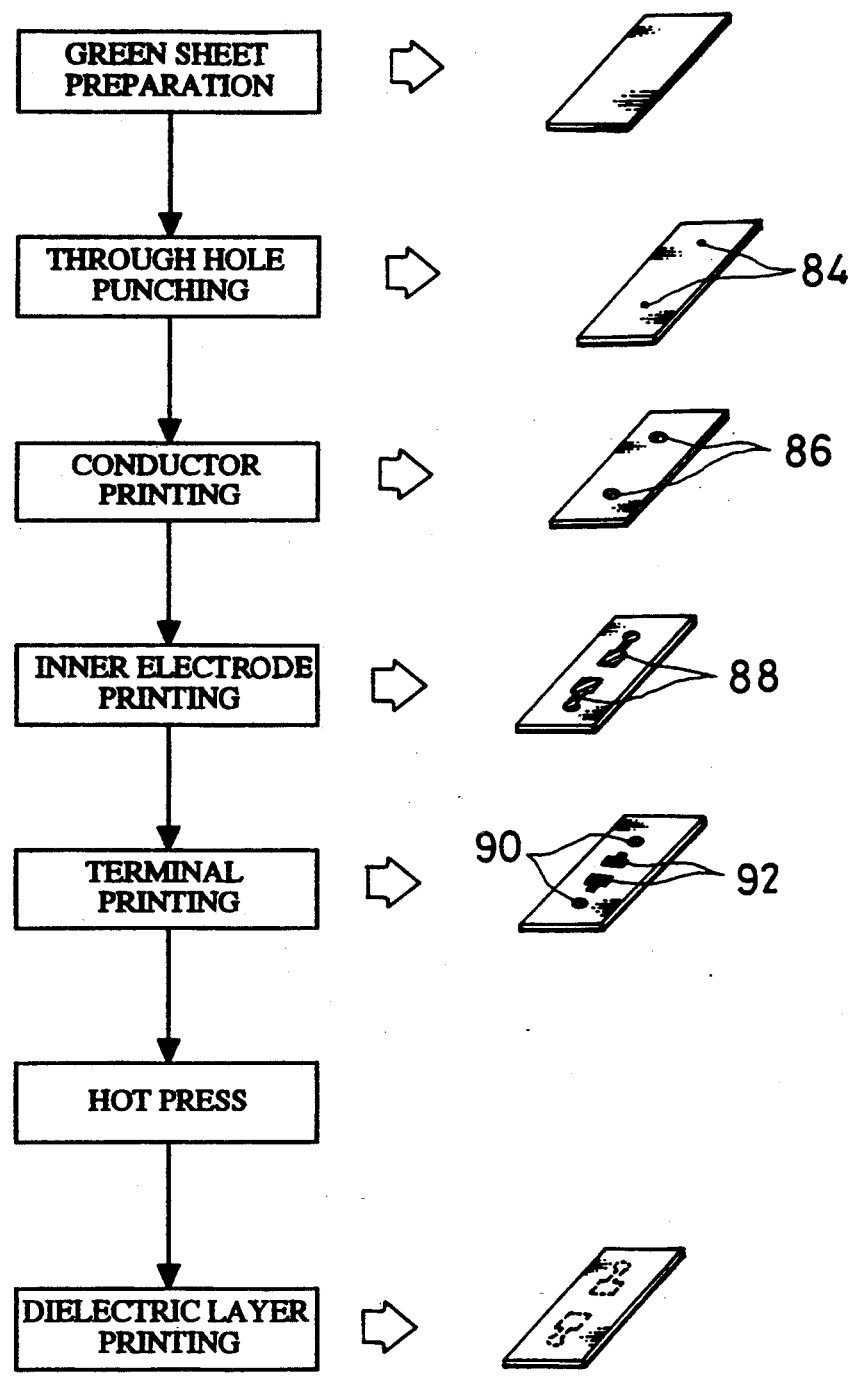
FIGS. 8A and 8B are production flowcharts illustrating the method according to the invention.
Figure 8B:
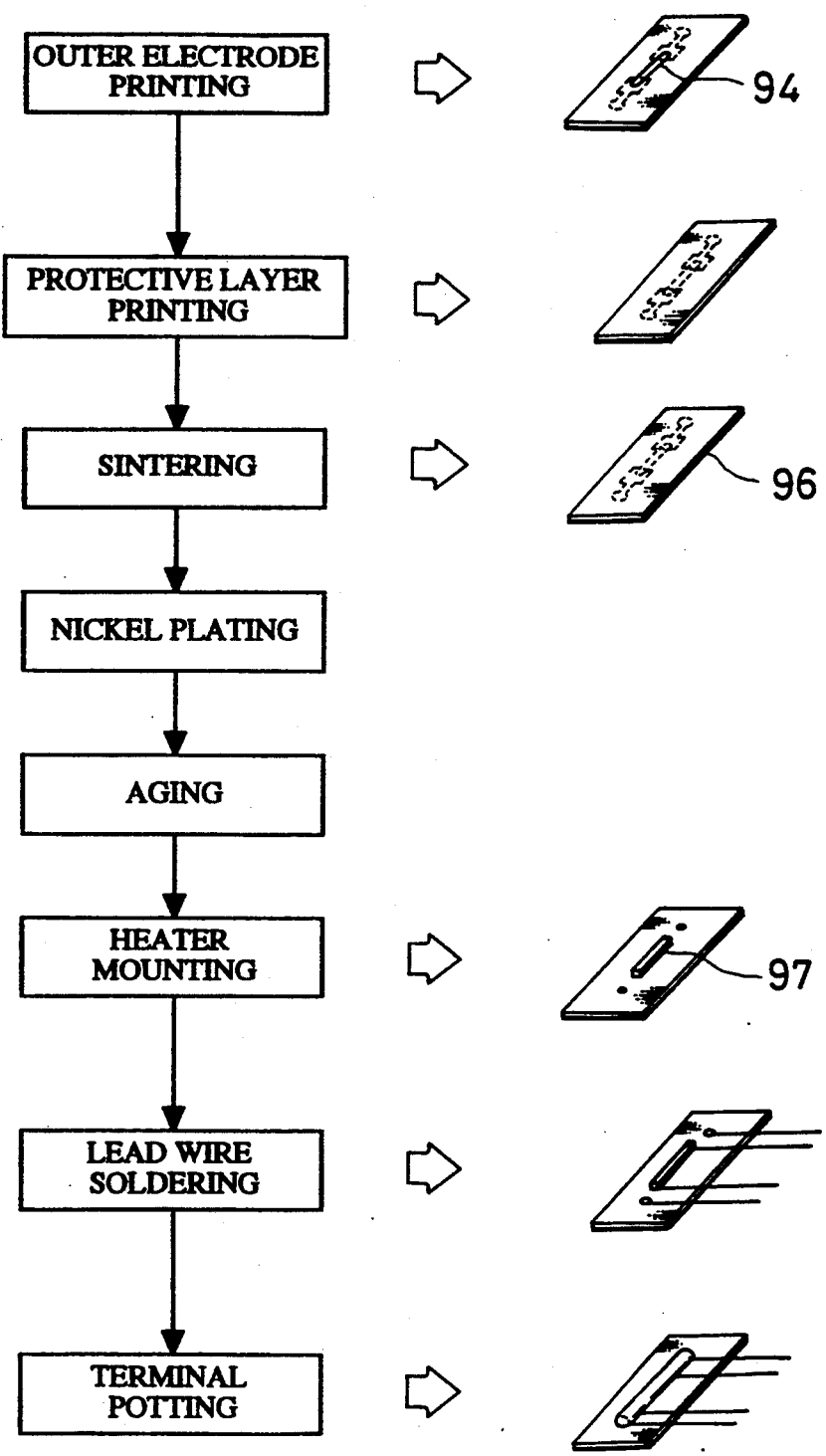

Next, the method of making the corona discharge device 50 according to the invention will be described with reference to the illustrative production flowchart shown in FIGS. 8A and 8B.

A slurry of ceramic-forming dielectric material, such as alumina ceramic-forming material, is first prepared and is formed into a green sheet by any conventional process such as doctor blade process. The green sheet is then subjected to punching to form a pair of through holes 84 which are intended to receive the electric conductors shown at 70 and 72 in FIG. 5. To this end, the through holes are filled with a paste 86 containing electrically conductive material, such as particulate tungsten, by any conventional printing technique such as screen printing. After drying, electrode patterns 88 for the inner electrodes 54 and 56 as well as terminal patterns 90 for the terminals 74 and 76 are printed with the paste of conductive material by the conventional printing technique on the upper and reverse surfaces of the green sheet, respectively, in contact with the paste 86 filled in the through holes. Preferably, terminal patterns 92 of the paste of conductive material are also printed on the reverse surface of the green sheet to provide terminals for an electric heater described later. After drying, the thus formed product is then hot pressed to flatten any surface irregularities.

Then a paste of ceramic-forming dielectric material, preferably having the same composition as the green sheet, is printed by conventional screen printing technique to form the dielectric layer 66. After drying, an electrode pattern 94 of the paste of conductive material is printed over the dielectric layer to provide the outer floating electrode 64 and the product is again subjected to drying. Thereafter, a paste of chemically-resistive electrically-insulating material is screen printed to form the protective layer 68. As alumina ceramics is both chemically resistive and electrically insulating, the paste of ceramic-forming dielectric material forming the dielectric layer 66 may be used to provide the protective layer 68. After drying, the product is subjected to sintering in a reducing atmosphere to obtain a foreproduct 96 of the corona discharge device. Preferably, the terminals 74, 76 and 92 are nickel plated to facilitate subsequent soldering of lead wires.

The thus prepared foreproduct of corona discharge device is then aged to obtain a final product by applying a high frequency alternating voltage between the inner electrodes 54 and 56. The voltage of aging must be higher than the initial minimum flashover voltage of the foreproduct. However, the voltage of aging should not be high enough to cause breakdown of the dielectric layer 66. Preferably, aging is carried out at a voltage slightly lower than the breakdown voltage of the dielectric layer 66. Aging may be continued until the initial minimum flashover voltage of the final product after aging is substantially lowered and until the fluctuation in the initial minimum flashover voltage after aging is practically eliminated. Preferably, aging may be carried out for more than about 5 seconds, preferably for about 10–300 seconds.

After aging, an electric heater such as a prefabricated single chip resistor 97 is preferably mounted to the substrate 52 in contact with the heater terminals 92. Use of an electric heater is desirable to prevent condensate of moisture from adhering to the protective coating 68 prior to commencement of operation of the corona discharge device and to maintain ozone producing capability of the device even in humid conditions. Finally, lead wires are soldered to the associated terminals and a conventional potting resin is molded to seal the soldered electrical connections.

EXAMPLE 1

Ceramic forming material was prepared by mixing 859 parts by weight of high purity alumina powders containing about 99.5% of $Al_2O_3$, 122 parts by weight of kaolin containing about 98.6% of kaolinite, 12 parts by weight of $MgCO_3$, 7 parts by weight of $CaCO_3$, and 700 parts by weight of water. The mixture was then subjected to grinding in an alumina ball mill until the average particle size is reduced to about 3 micrometers. The mixture was then dried to obtain ceramic forming material containing less than 0.3% of water. Added to 225 parts by weight of the thus prepared ceramic forming material were 18 parts by weight of polyvinylbutyral, 15 parts by weight of dibutylphthalate, 1 part by weight of deflocculant, 62 parts by weight of toluene, and 26 parts by weight of isopropyl alcohol. The mixture was subjected to mixing in an alumina ball mill for about 20 hours and was subjected to vacuum for degassing. The mixture was then aged for about 20 hours to obtain a slurry of ceramic forming material. The slurry thus prepared was then rolled by a conventional doctor blade method into a strip of green ceramic material having a thickness of about 0.83 mm. The strip was then transferred to a press wherein the strip was cut into sheets and through holes were simultaneously punched through respective green sheets. Several of the thus prepared green sheets were reserved to form an alumina paste as described later.

The through holes of the green sheets were then filled with a conventional tungsten paste by screen printing. After drying, terminal patters of tungsten paste were similarly printed on one face of each green sheet which is again subjected to drying. Then, printed patterns of tungsten paste for the inner electrodes were formed by screen printing on the other face of each green sheet, followed by drying. The products were then hot pressed at about 60° C. for about 20 seconds. Then, an alumina paste for the dielectric layer was coated over the inner electrode patterns by screen printing. In order to provide a uniformity in particle size between the dielectric layer and the underlying layer of the substrate, the alumina paste used for screen printing of the dielectric layer has conveniently been prepared by heating some of the green sheets to evaporate volatile additives and by adding thereto conventional paste forming vehicles. After drying, an electrode pattern for the outer floating electrode was screen printed using the tungsten paste and the product was subjected to drying. Thereafter, the floating electrode pattern was coated by screen printing of the similar alumina paste to provide the protective layer and the product was again dried. A plurality of the thus prepared products were then sintered in a nitrogen-rich reducing atmosphere for about 30 hours in a continuous sintering furnace having a temperature gradient varying from 300° C. to 1580° C. to obtain a batch of foreproducts of corona discharge device.

In each of the foreproducts prepared in this manner, the dielectric layer 66 had an average thickness D of about 50 micrometers, with the protective layer 68 having an average thickness d of about 10 micrometers. The alumina ceramics forming the dielectric layer 66 and the protective layer 68 contained, in weight percentage, about 92.5% of $Al_2O_3$, about 5.7% of $SiO_2$, about 1.0% of CaO, and about 0.6% of MgO, the balance being impurities.

The foreproducts were subjected to aging under varying conditions as described later and the effect of aging was investigated by measuring the variation in the minimum flashover voltage. For the purposes of comparison, several comparative examples of corona discharge device without the protective layer were also made and tested. These comparative examples were made in the same manner as the foreproducts except that the outer floating electrode was not coated by a protective layer.

Figure 9:
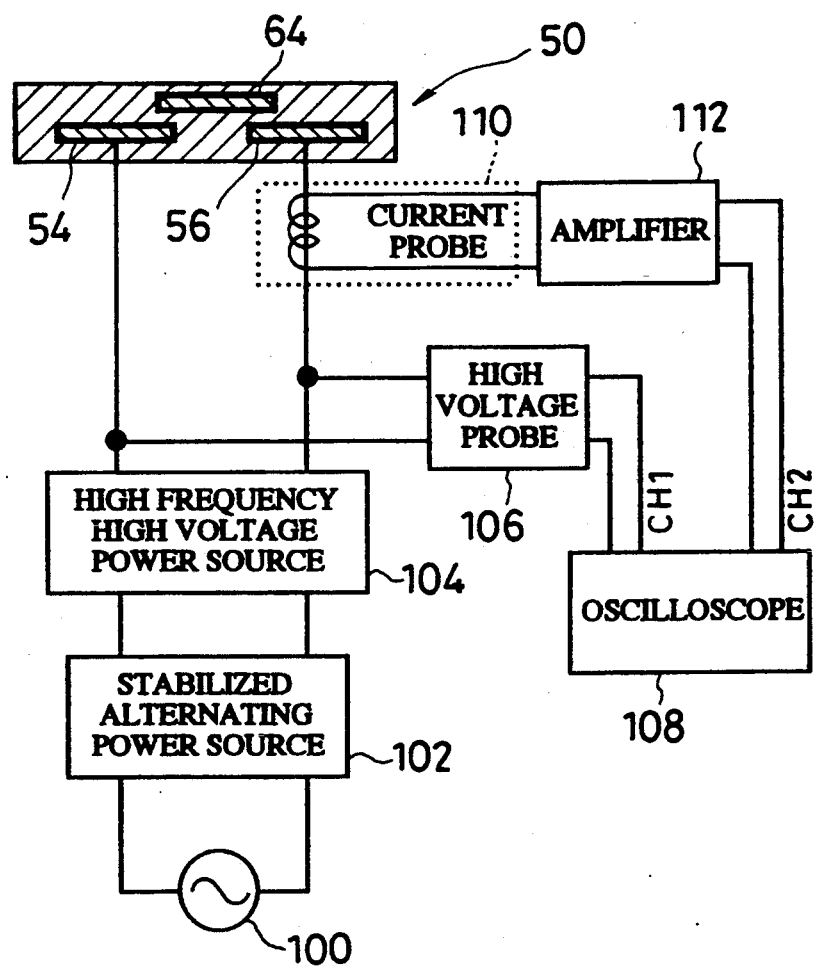
FIG. 9 is a diagrammatic view showing the apparatus used for testing and measurement.

Aging of the foreproducts as well as measurement of the minimum flashover voltage were carried out by using an apparatus shown in FIG. 9. Alternating current from a public alternating power source 100 was stabilized by a conventional stabilized power source 102 and was supplied therefrom to a conventional variable-voltage high-frequency high-voltage power source 104 having a fixed output frequency of 15 kHz. The output from the power source 104 was applied through a pair of lead wires to a particular corona discharge device under testing. The variable output voltage from the power source 104 was detected by a conventional high voltage probe 106, marketed by Iwatsu Co., Ltd. under Model HV-P30, connected between the lead wires. The output from the probe 106 was forwarded to a first channel of a conventional oscilloscope 108 to measure the peak-to-peak voltage by visual inspection. The intensity of electric current flowing through the corona discharge device was picked up by a conventional current probe 110 associated with one of the lead wires, the output of the current prove 110 being sent to a second channel of the oscilloscope after being amplified by a conventional amplifier 112.

Aging of the foreproducts was performed under varying voltage and time conditions. That is, a series of foreproducts were aged at a given voltage for a predetermined time, with another series being aged at the same voltage for different time, with a further series being aged at different voltage for different time, and so on. Another series of foreproducts were retained for testing and measurement without aging.

Variation in the minimum flashover voltage of a particular corona discharge device was measured in the following manner. After the high-frequency high-voltage power source 104 was turned on, a voltage control dial thereof was manually operated to increase the output voltage until corona discharge took place within about 10 seconds from voltage increase. Occurrence of corona discharge was detected by inspecting wave form of the electric current flowing through the corona discharge device as detected by the current probe 110 and displayed in the oscilloscope 108 via the second channel thereof, the occurrence of corona discharge being confirmed by visual inspection. Then the oscilloscope was switched over to the first channel to see the voltage as detected by the high voltage probe 106. The voltage thus detected for an unused corona discharge device is the initial minimum flashover voltage as defined hereinbefore. Then, each corona discharge device under test was operated at a normal operating peak-to-peak voltage of about 5.4 $kV_{pp}$ for a maximum period of about 2,000 seconds. Operation was discontinued from time to time at various phases of operation to measure the minimum flashover voltage in the same manner.

Effect of the protective layer and the effect of aging thereof will be discussed with reference to the graphs of FIGS. 10–16 wherein the results of measurement of the minimum flashover voltage are plotted. Throughout these graphs, the ordinate represents the minimum flashover voltage in $kV_{pp}$ and the abscissa indicates the total time, in second, of operation at the above-mentioned normal operation voltage. The results plotted by a circle, a triangle and a dot indicate, respectively, the maximum value, the minimum value and the average value of the minimum flashover voltage as measured for a series of corona discharge devices numbering from 5 to 10 in total.

Figure 10:
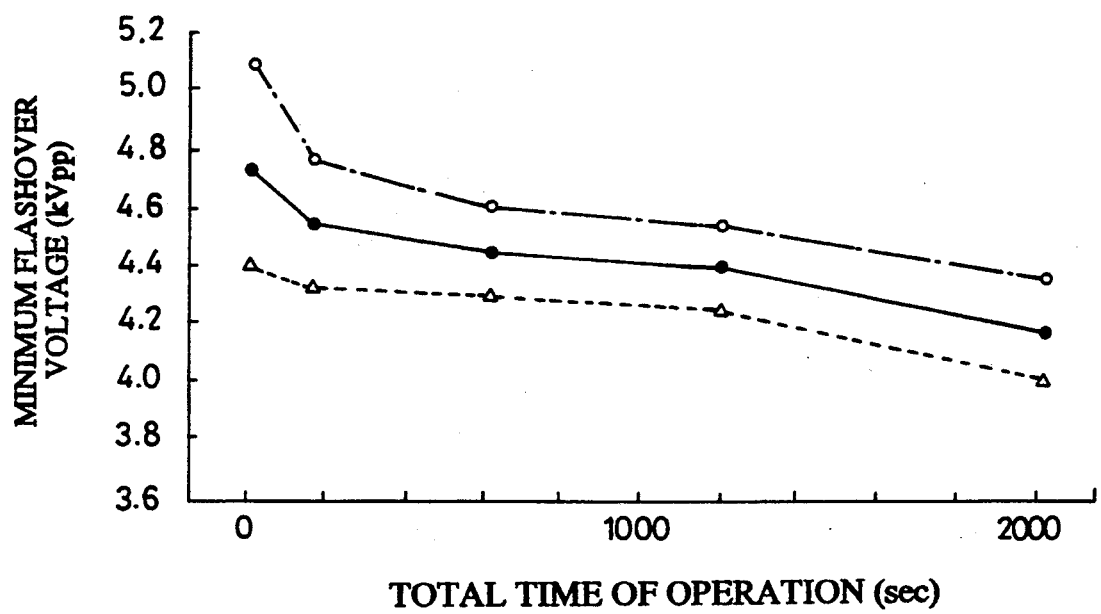
FIG. 10 is a graph showing the variation in the minimum flashover voltage of the corona discharge devices each having a non-aged protective layer.

Referring first to the graph of FIG. 10, there is shown the variation, as a function of total time of operation, of the minimum flashover voltage as measured for a series of foreproducts which were never subjected to aging. It will be noted from this graph that, in the corona discharge devices having a non-aged protective layer, the initial minimum flashover voltage, i.e., the minimum flashover voltage exhibited when the time of operation is zero, fluctuated from device to device over a wide range of fluctuation ranging from about 4.4 $kV_{pp}$ to about 5.1 $kV_{pp}$. The present inventors believe that such a wide fluctuation in the initial minimum flashover voltage is probably because the surface roughness of the protective layer 68 varies from device to device since that layer is formed by sintering of ceramic forming material. It will be also noted from the graph of FIG. 10 that, as the device was operated at the normal operating voltage, the magnitude of fluctuation in the minimum flashover voltage was rapidly reduced and the average minimum flashover voltage gradually lowered. This is probably due to the microscopic projections on the surface of the ceramic protective layer being reformed or altered by the energy of corona discharge.

Figure 11:
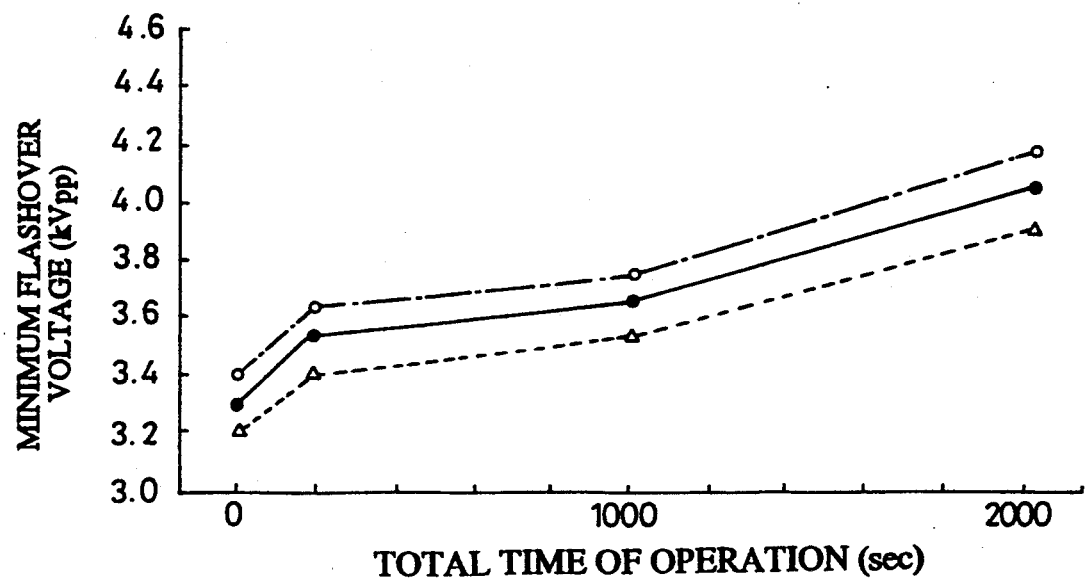
FIG. 11 is a graph showing the variation in the minimum flashover voltage of the comparative examples which are not provided with a protective layer.

Referring to the graph of FIG. 11, there is plotted the variation in the minimum flashover voltage as measured for the comparative examples of corona discharge device wherein the outer floating electrode was uncoated. In contrast to the results shown in the graph of FIG. 10, the initial minimum flashover voltage was considerably lower and the fluctuation thereof was very small due to the absence of the protective layer. However, it will be observed that the minimum flashover voltage was progressively increased in response to the total time of operation. Clearly, this is due to the increase in the electric resistance of the floating electrode resulting from oxidation and sputtering.

The graphs of FIGS. 12–16 show the test results obtained with different series of corona discharge device subjected to aging according to the present invention under different conditions.

Figure 12:
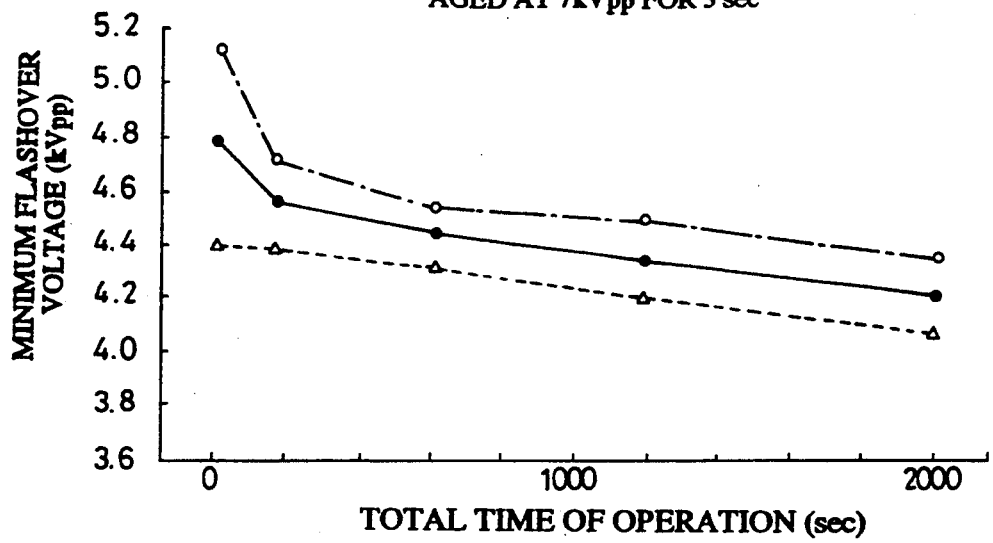
FIGS. 12–16 are graphs showing the variation in the minimum flashover voltage of corona discharge devices aged under varying conditions.

FIG. 12 shows the test results of a first series of corona discharge device subjected to aging at 7 $kV_{pp}$ for 3 seconds. As compared with the graph of FIG. 10, no appreciable change in the minimum flashover voltage will be noted. It is considered that the degree of aging is insufficient to improve the property of the protective layer.

Figure 13:
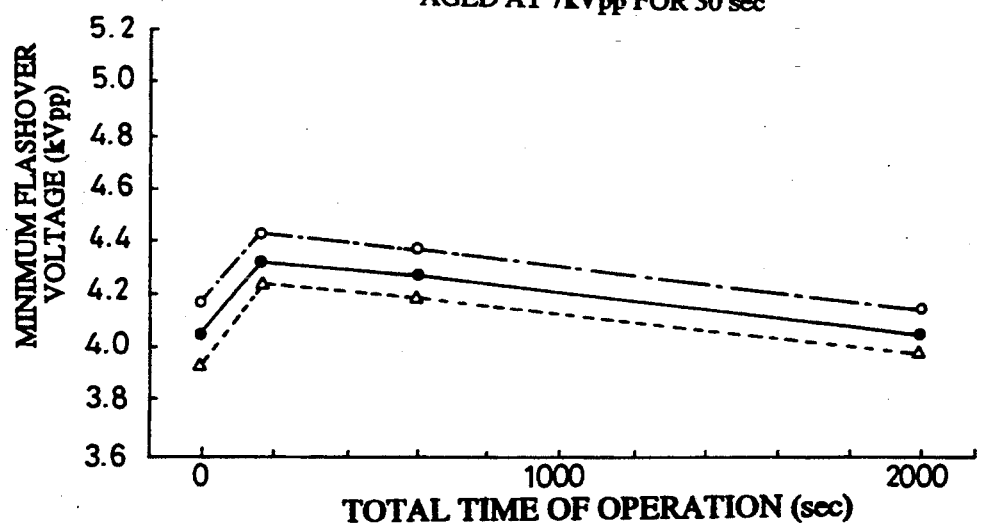

FIG. 13 shows the test results obtained with a second series of corona discharge device subjected to aging at 7 $kV_{pp}$ for 30 seconds. By comparing with FIGS. 10 and 12, it will be noted that the range of fluctuation in the initial minimum flashover voltage was remarkably narrowed. In addition, the average initial minimum flashover voltage was considerably lowered. As the device was operated at the normal operating voltage of 5.4 $kV_{pp}$, the minimum flashover voltage showed a slight drift or transitional recovery in the earlier phase of operation but thereafter decreased continuously.

Figure 14:
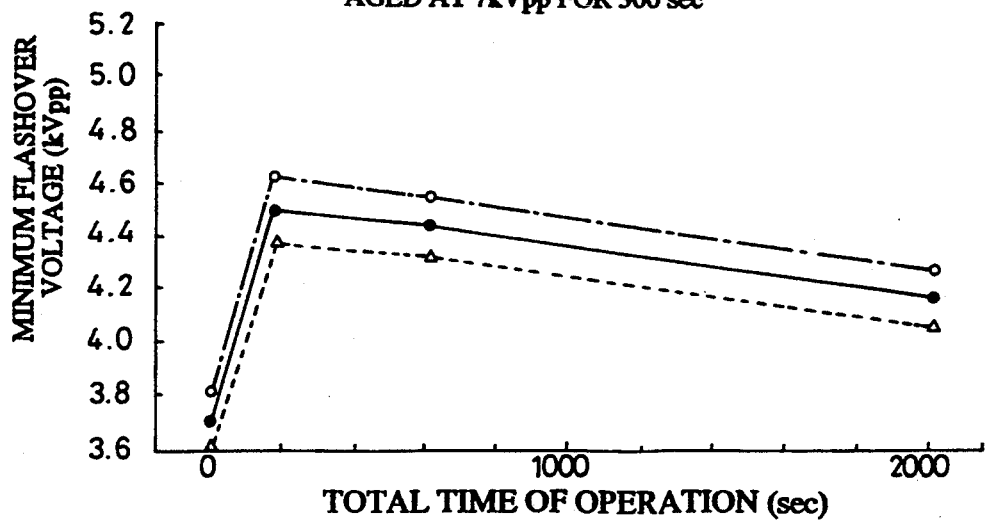

FIG. 14 shows the test results of a third series of corona discharge device aged at 7 $kV_{pp}$ for 300 seconds. The average initial minimum flashover voltage was lower than that shown in FIG. 13 but the degree of transitional recovery was correspondingly higher.

Figure 15:
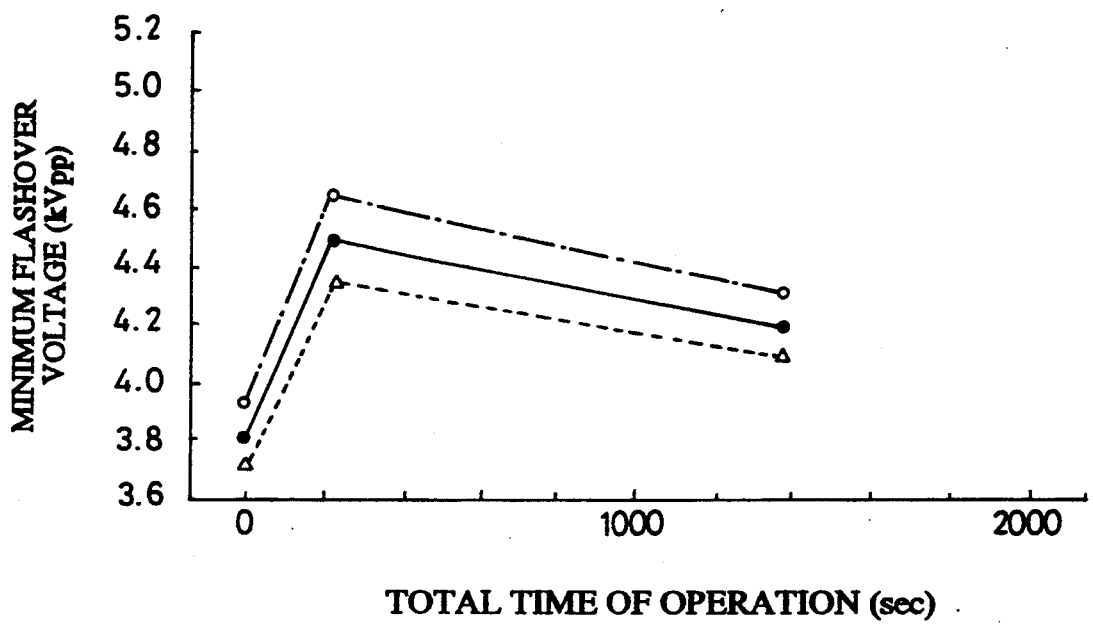
Figure 16:
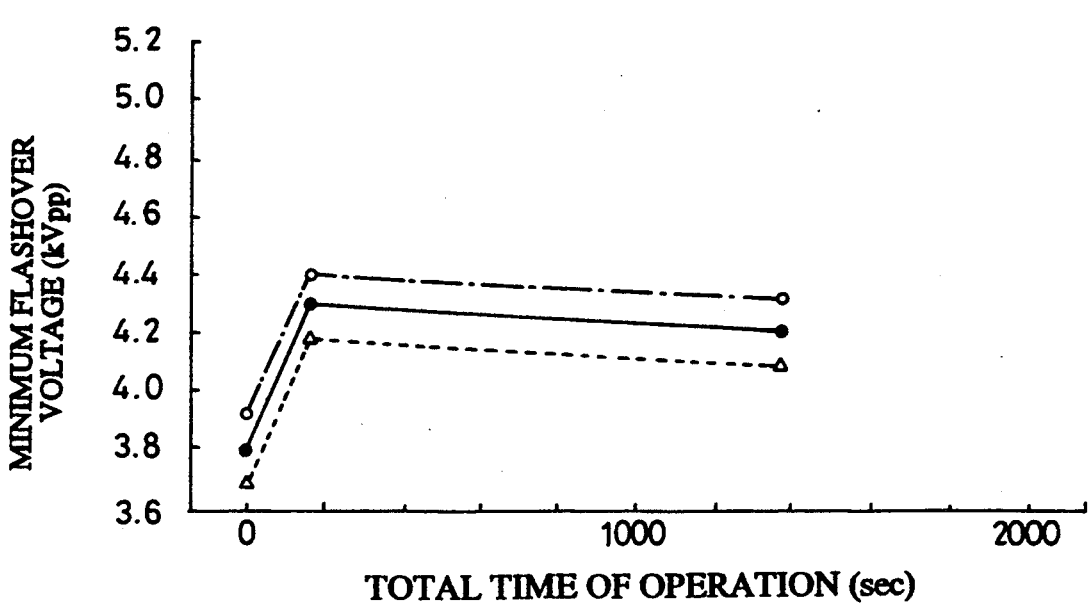

FIGS. 15 and 16 indicate the test results obtained with a fourth and a fifth series of corona discharge device aged, respectively, for 30 and 120 seconds at 8 $kV_{pp}$. Aging under these conditions was also effective in lowering the initial minimum flashover voltage as well as in reducing the fluctuation in the initial minimum flashover voltage.

Figure 17:
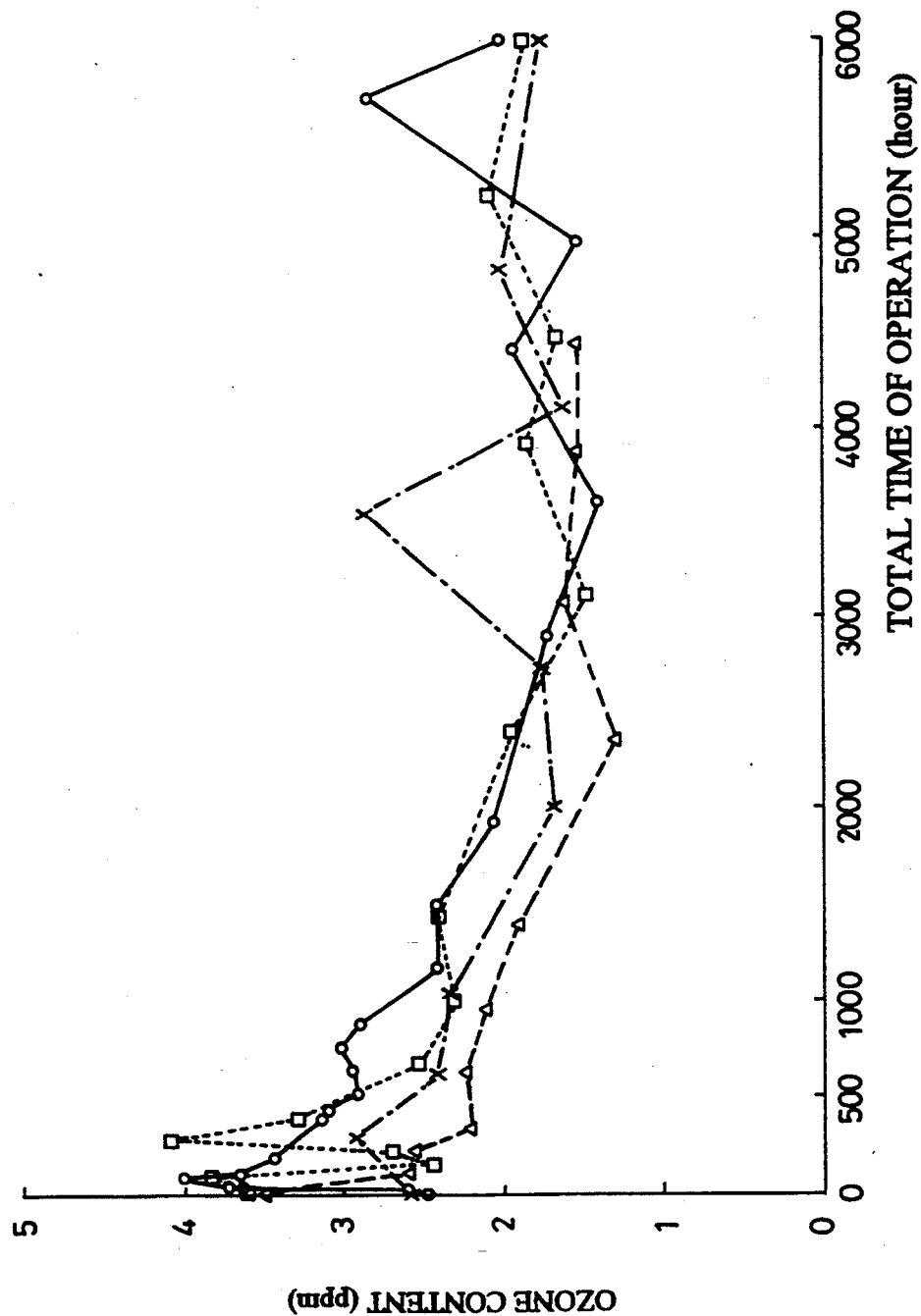
FIG. 17 is a graph showing the variation in the ozone content measured for corona discharge devices manufactured according the method of the invention.

A plurality of corona discharge devices aged at a voltage equal to or higher than 7 $kV_{pp}$ for at least 30 seconds were then operated for 6,000 hours in a flow of dry air flowing at a flow rate of 10 liters per minute and the content of ozone being generated was monitored. The results of the test are plotted in the graph of FIG. 17. As will be noted therefrom, the corona discharge devices subjected to sufficient aging were capable of producing about 2 ppm of ozone throughout the operating period totalling 6,000 hours. Decline in the ozone productivity after 6,000 hours of operation was not greater than about 30% of the initial productivity.

EXAMPLE 2

Another series of experiments were conducted to find out an optimum composition of alumina ceramics which could provide a high degree of dielectric strength of the dielectric layer 66 (FIG. 5) and a prolonged service life of the corona discharge device. Green sheets having varying CaO content were prepared in the manner similar to Example 1 and were provided with printed electrode patterns of tungsten paste. The products were then sintered in the same manner as Example 1 to obtain five series of specimens of metallized alumina ceramics. The CaO content of the alumina ceramics of respective series of specimens was 0.5%, 0.8%, 1.0%, 1.2% and 1.5%, respectively, in weight percentage. These specimens were subjected to various testings and analyses, the results of which will be described below.

Figure 18:
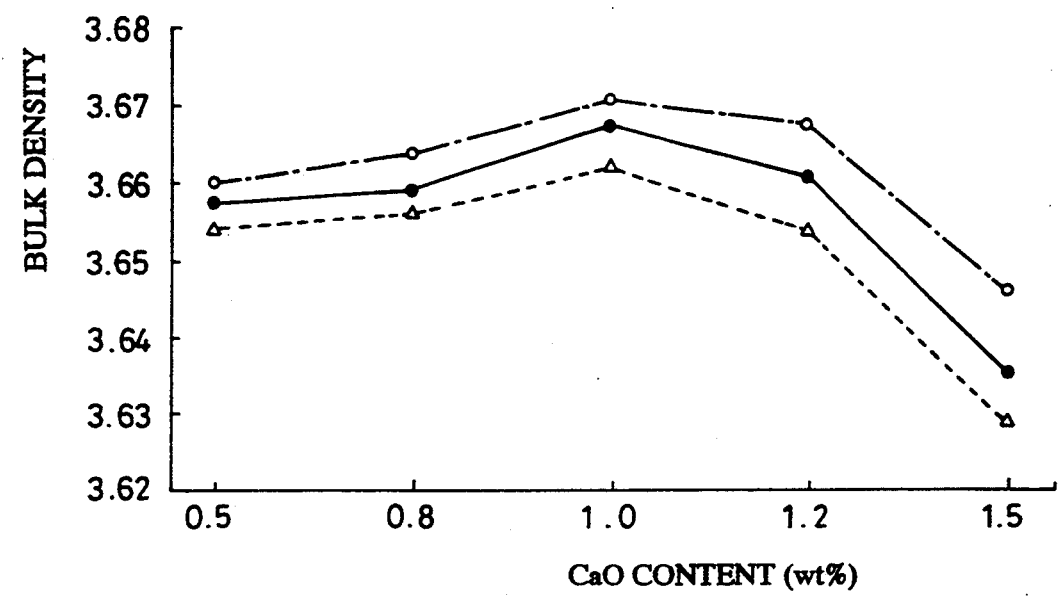
FIG. 18 is a graph showing the bulk density of the dielectric ceramics having varying CaO content.

FIG. 18 shows the bulk density of the alumina ceramics as measured for the five series of specimens. In the graph of FIG. 18, the maximum value, the minimum value and the average value of the measured bulk density are plotted, respectively, by a circle, a triangle and a dot. It will be noted that the average bulk density was higher for the CaO content of from 0.8% to 1.2% and had a peak value when the CaO content was about 1.0%. This indicates that, with the CaO content of about 1%, the ceramic structure comprised of alumina particles bonded by intergranular $SiO_2$ glass was rendered most dense and compact and was more free from internal voids.

This was confirmed by X-ray diffraction analysis the results of which are reproduced in FIGS. 19A–19E. As shown therein, mullite ($2SiO_2.3Al_2O_3$) was formed when the CaO content was equal to or less than 0.8%, while anorthite ($CaO.Al_2O_3.2SiO_2$) was formed when the CaO content was equal to or greater than 1.5%. It is believed that formation of mullite or anorthite undesirably consumed $SiO_2$ and prevented formation of intergrannular $SiO_2$ glass.

Figure 20:
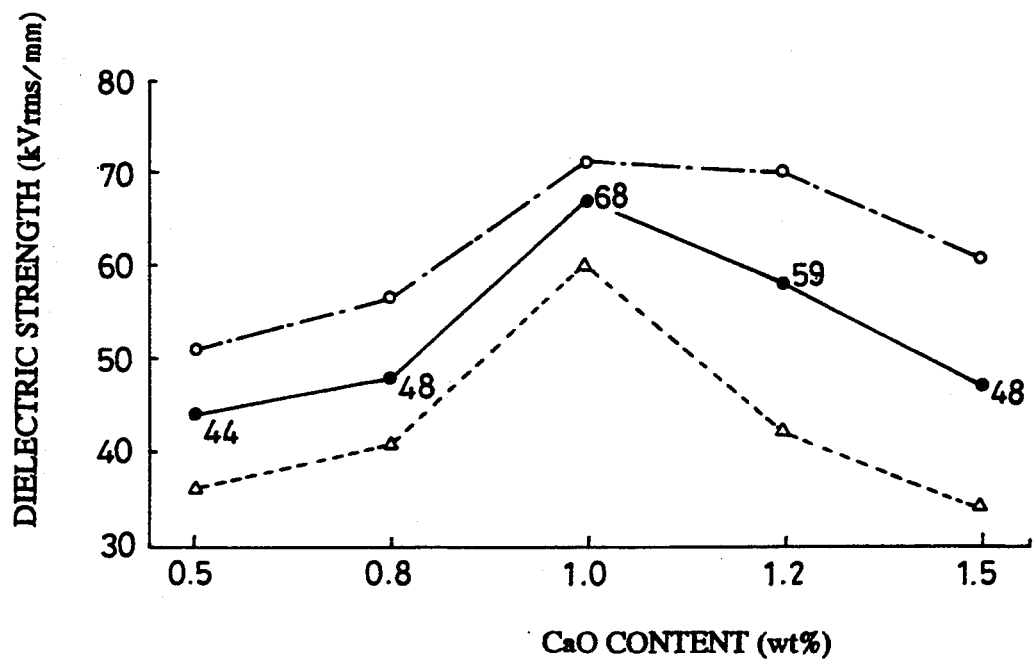
FIG. 20 is a graph showing the dielectric strength of the dielectric ceramics having varying CaO content.

FIG. 20 indicates the results of dielectric strength test carried out for the series of specimens. Also in the graph of FIG. 20, a circle, a triangle and a dot designate, respectively, the maximum value, the minimum value and the average value of the measured dielectric strength. It will be noted from the graph of FIG. 20 that the alumina ceramics presented maximum dielectric strength when the CaO content was about 1%. Obviously, this is because, with the CaO content of 1%, the formation of internal voids was minimized so that the dielectric ceramics was free from void discharge which would otherwise result in premature breakdown. Accordingly, a high degree of dielectric strength of the dielectric layer can be provided by controlling the CaO content toward 1%.

Figure 21A:
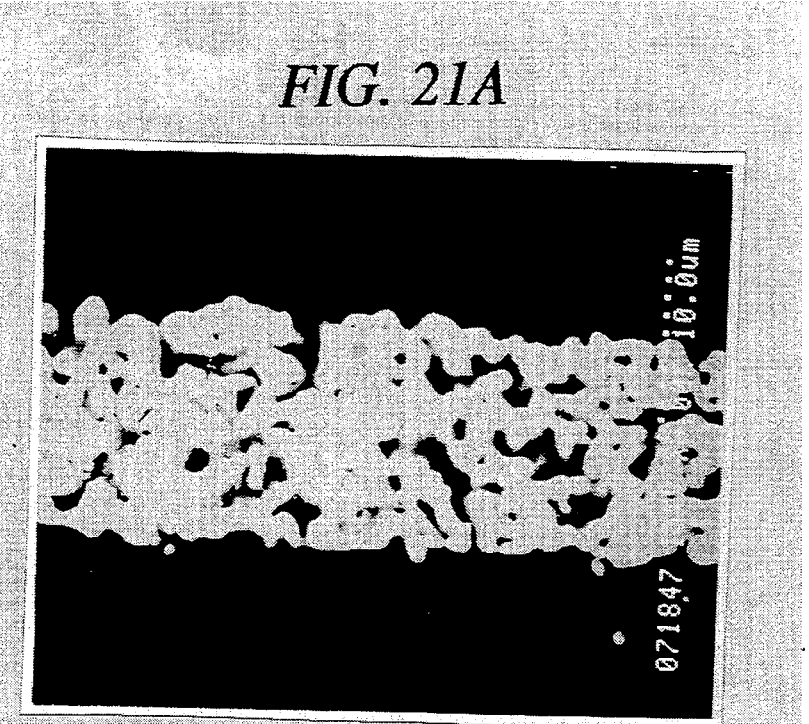
FIGS. 21A and 21B are scanning electron microscope photographs showing the cross section of the metallized layer of two specimens having the CaO content of 1.0% and 0.5%, respectively.
Figure 21B:
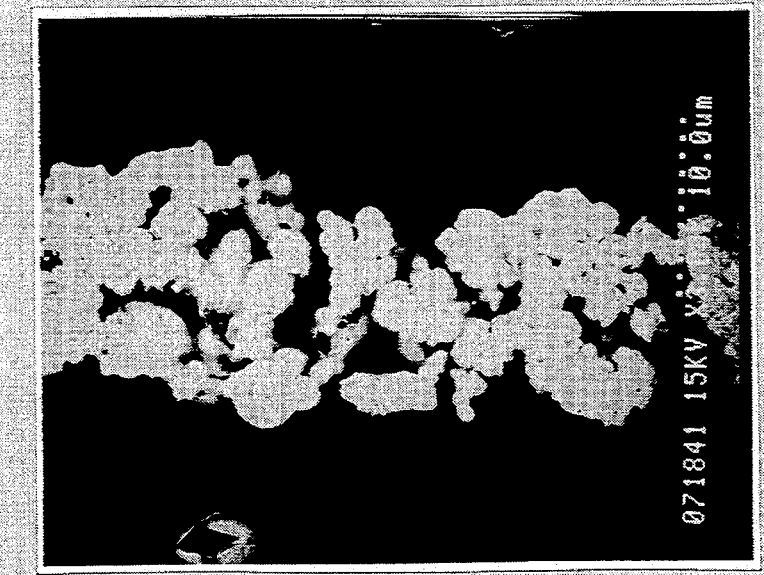

FIGS. 21A and 21B are microscopic photographs taken by a scanning electron microscope and showing the cross section of the metallized layer of two specimens having the CaO content of 1.0% and 0.5%, respectively. It will be noted from the photograph of FIG. 21B that, when the CaO content was 0.5%, a large number of internal voids were formed between tungsten particles as well as along the interface between the metallized electrode layer and the alumina ceramics. In contrast, with the CaO content of 1.0%, the intergrannular spaces between tungsten particles as well as the interstices between the alumina ceramics and the metallized layer were filled by $SiO_2$ glass, as will be apparent from the photograph of FIG. 21A. This indicates that the CaO content of the alumina ceramics also had an effect on migration of $SiO_2$ glass that took place during sintering from the body of the alumina ceramics into the metallized layer. Obviously, a profound migration of $SiO_2$ glass was resulted when the CaO content was 1.0%, thereby preventing formation of both internal and interstitial voids. Formation of voids internal to the metallized layer is disadvantageous in that, due to void discharge across the metallized layer, the electric resistance of the electrode is prematurely increased so that the service life of the corona discharge device is shortened. Formation of interstitial voids is undesirable because void discharge across such interstitial voids promotes breakdown of the dielectric layer. Therefore, by optimizing the CaO content, a high degree of dielectric strength of the dielectric layer and a prolonged service life of the corona discharge device can be provided.

Figure 22:
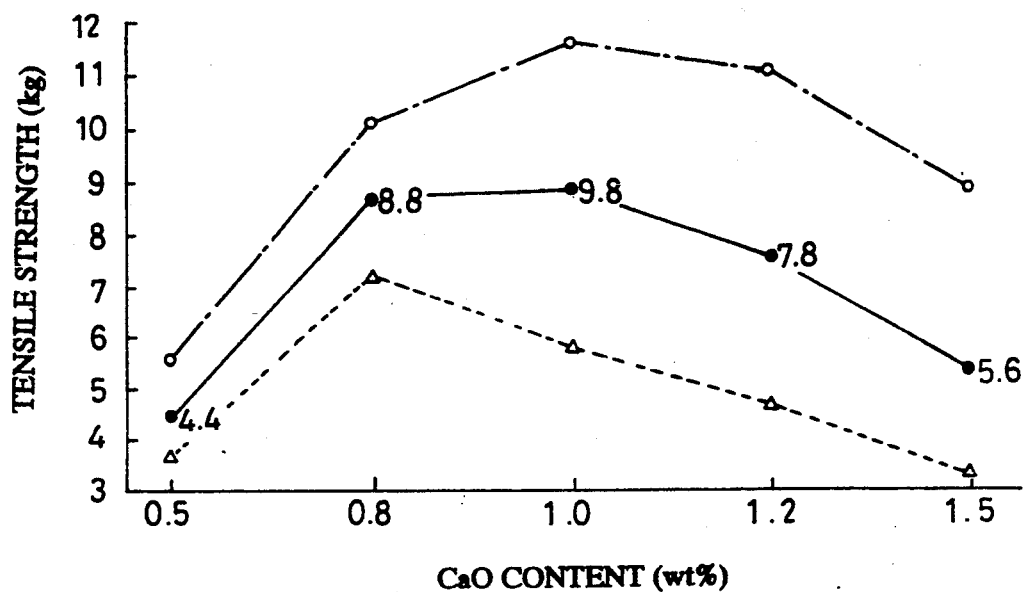
FIG. 22 is a graph showing the tensile strength of the dielectric ceramics having varying CaO content.

The graph shown in FIG. 22 indicates the results of a tensile test wherein tensile stress was applied between the the metallized layer and the dielectric layer of respective specimens. As shown, the tensile strength revealed a maximum value for the CaO content of 1%. These test results support the fact that the intergrannular spaces between tungsten particles as well as the interstices between the alumina ceramics and the metallized layer were adequately occupied by the migrated $SiO_2$ glass when the CaO content was 1%.

Figure 23:
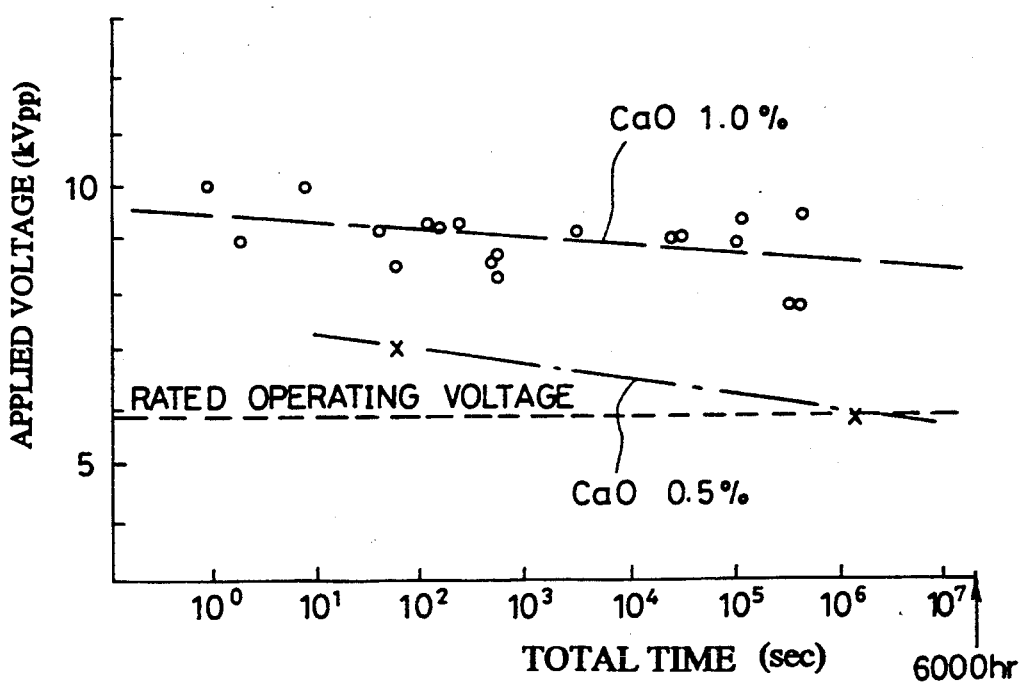
FIG. 23 is a graph showing the results of the life test conducted for corona discharge devices made from the dielectric ceramics having different CaO content.

Two examples of corona discharge device were prepared in the manner similar to Example 1 from an alumina ceramics having the CaO content of 0.5%. These examples as well as a series of the foreproducts of Example 1 made from an alumina ceramics having the CaO content of about 1.0% were subjected to a life test to see how long the dielectric layer thereof could withstand breakdown under various voltage conditions. The results of the life test are shown in the graph of FIG. 23 wherein the ordinate indicates the applied voltage and the abscissa represent, in the logarithmic scale, the total time elapsed before breakdown occurred. As plotted therein by cross marks, the corona discharge device made from the alumina ceramics having the CaO content of 0.5% was broken down by 80 seconds of application of voltage of 7 $kV_{pp}$ and could not outlast 600 hours of application of the rated operating voltage of 5.7 $kV_{pp}$. In contrast, the foreproducts made from the alumina ceramics having the CaO content of about 1.0% showed a tendency to outlast 6,000 hours of operation at a voltage much higher than the rated operating voltage of 5.7 $kV_{pp}$, as will be understood from the inclined dotted line indicating the average of the values plotted by the circles.

The dielectric layer must withstand both (1) a relatively high aging voltage applied for a short period during aging and (2) a relatively low operating voltage applied throughout the service life of corona discharge device during normal operation. The test results shown in FIG. 23 also teaches that, with the CaO content of 1.0%, aging for less than 100 seconds at a voltage of 8 $kV_{pp}$ would not inadvertently cause breakdown of the dielectric layer.

EXAMPLE 3

In the corona discharge device described hereinbefore, the thickness D of the dielectric layer 66 and the thickness d of the protective layer 68 must be large enough to avoid breakdown and to adequately protect the outer electrode 64. If excessively increased, however, a high operating voltage would be required in order to generate corona discharge across the air gap because most part of the applied voltage is consumed for polarization of the dielectric material. Therefore, the upper limit of the thickness is dictated by the routine operating voltage at which the corona discharge device is intended to be operated, which voltage, in turn, is limited by the size and cost of the high frequency power source available for routine operation. Because the minimum flashover voltage of the device undergoes a slight drift or rise during operation as described hereinbefore with reference to FIG. 13, aging of the foreproducts of corona discharge device must be carried out to such a degree that the initial minimum flashover voltage, after aging, becomes lower than the projected routine operating voltage. Investigations were made and experiments conducted to determine the permissible thickness range meeting with the limitations imposed on the available power source, the results of which will be described below.

Figure 24:
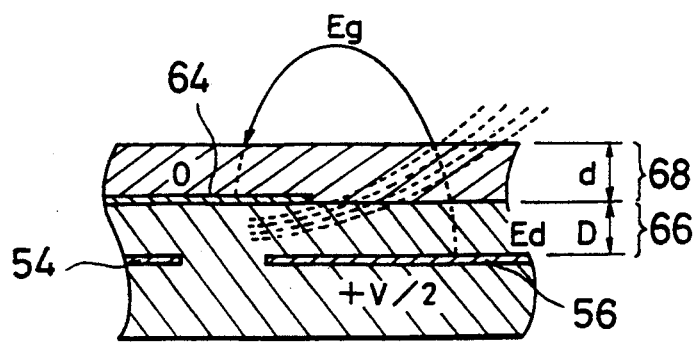
FIG. 24 is a cross-sectional representation similar to FIG. 5 but schematically showing a part of the corona discharge device.

Referring to FIG. 24 wherein part of the corona discharge device is schematically reproduced, when a voltage V is applied between the inner electrodes 54 and 56, an electric field is developed between the outer floating electrode 64 and each of the inner electrodes. Assuming that the vector of the electric field developed across the dielectric layer 66 and the protective layer 68 is perpendicular thereto, the following relationship is established.

$$V/2 = E_d \cdot (D + 2d) + E_g \cdot X \quad (1)$$

wherein $E_d$ is the electric field strength developed across the dielectric layer and the protective layer, $E_g$ is the electric field strength developed across the air gap, X is the total length of the air gap, D is the thickness of the dielectric layer 66, and d is the thickness of the protective layer 68.

Figure 25:
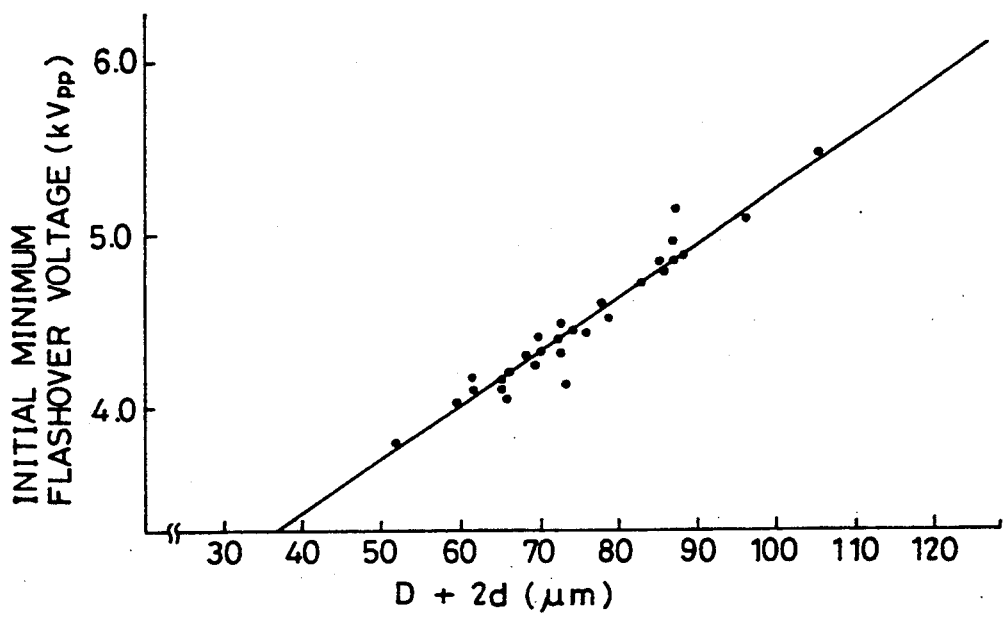
FIG. 25 is a graph showing the variation in the initial minimum flashover voltage as measured for varying total effective thickness of the ceramic layers.

A series of foreproducts having varying total effective thickness of D plus 2d (D+2d) were made in a manner similar to Example 1. After aging at 7 kV$_{pp}$ for about 30 seconds, the initial minimum flashover voltage was measured, the results of the measurement being plotted in the graph of FIG. 25 wherein the ordinate represents the initial minimum flashover voltage in kV$_{pp}$ and the abscissa represents the total effective thickness D plus 2d in micrometers. From the relationship shown in the graph of FIG. 25, the following regressive function is obtained.

$$U_i = 0.03(D + 2d) + 2.2 \quad (2)$$

wherein $U_i$ is the initial minimum flashover voltage in kV$_{pp}$.

As the projected operating voltage $V_o$ must be higher than the initial minimum flashover voltage ($V_o > U_i$), $$V_o > 0.03(D + 2d) + 2.2 \quad (3)$$

In view of the size and cost of currently available high frequency power source, it is preferable that the normal operating voltage $V_o$ does not exceed 6 kV$_{pp}$. In consideration of the aforementioned drift of the minimum flashover voltage that occurs during operation, if $V_o = 6$ kV$_{pp}$, then the initial minimum flashover voltage is preferably about 4.9 kV$_{pp}$. In that event, from equation (2), the total effective thickness D plus 2d is roughly 90 (D+2d≈90). Assuming that the average thickness d of the protective layer 68 is 10 micrometers, the maximum thickness of the dielectric layer 66 is therefore 70 micrometers.

Figure 26:
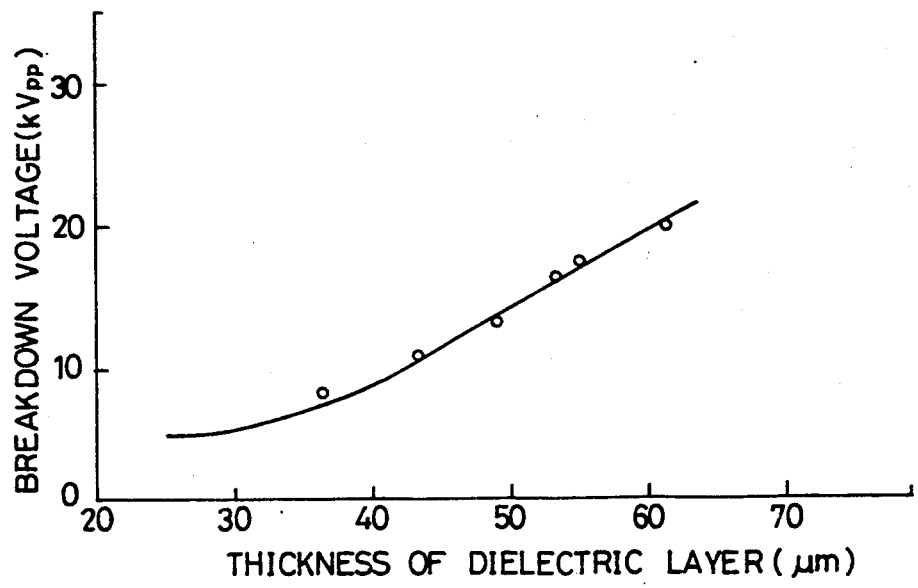
FIG. 26 is a graph showing the breakdown voltage of the dielectric layer having varying thickness.

The minimum thickness of the dielectric layer 66 is dictated by the breakdown voltage thereof. According to the results of testing shown in the graph of FIG. 26, wherein the breakdown voltage is indicated for varying thickness of the dielectric layer 66, it is believed that a minimum thickness of 25 micrometers is required for the dielectric layer 66 to avoid breakdown.

Thickness requirement for the protective layer 68 was examined by corrosion test. It was found that the protective layer was able to sufficiently protect the outer electrode from corrosion when the thickness d was 7 micrometers. It was also found that, if the thickness of the protective layer exceeded 20 micrometers, the delay time that elapsed after application of voltage and prior to commencement of corona discharge became prohibitive.

As a conclusion, when the projected operating voltage of the corona discharge device is 6 kV$_{pp}$, the preferable range of thickness of the dielectric layer 66 is about 25-70 micrometers and the desirable thickness of the protective layer 68 is about 7-20 micrometers.

Figure 27:
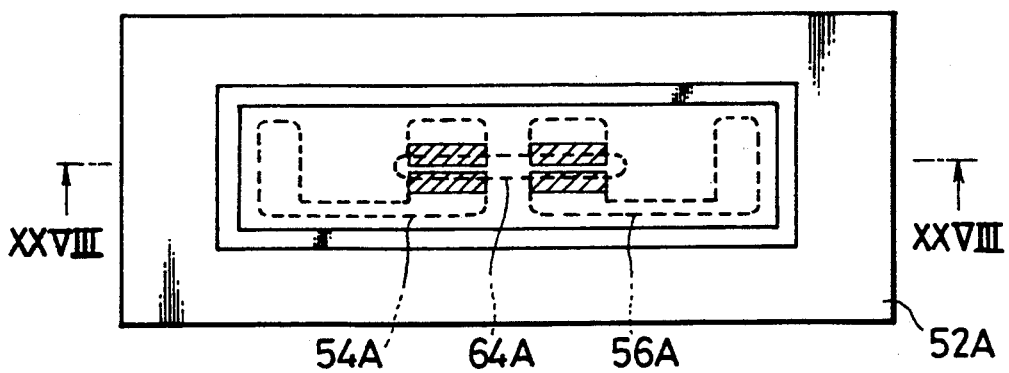
FIGS. 27 and 29 are plan views similar to FIG. 4 but showing different electrode patterns.
Figure 28:
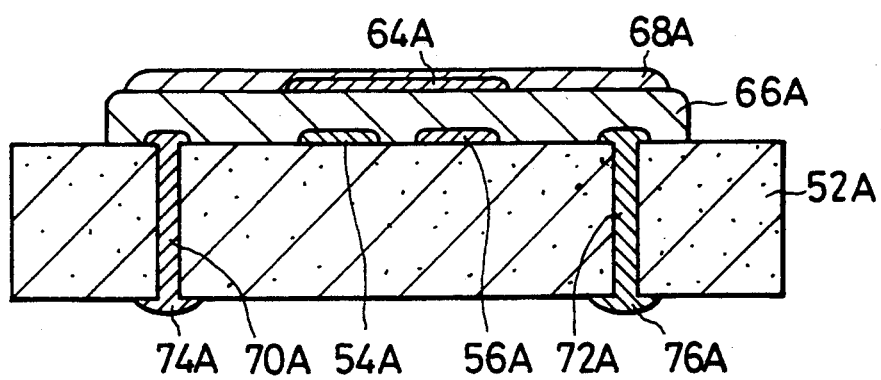
FIGS. 28 and 30 are cross-sectional views similar to FIG. 5 but taken along the line XXVIII—XXVIII of FIG. 27 and the line XXX—XXX of FIG. 29, respectively.
Figure 29:
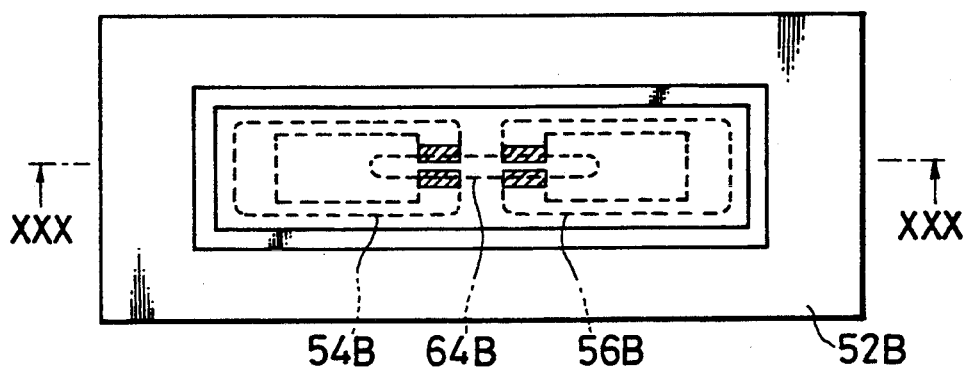
Figure 30:
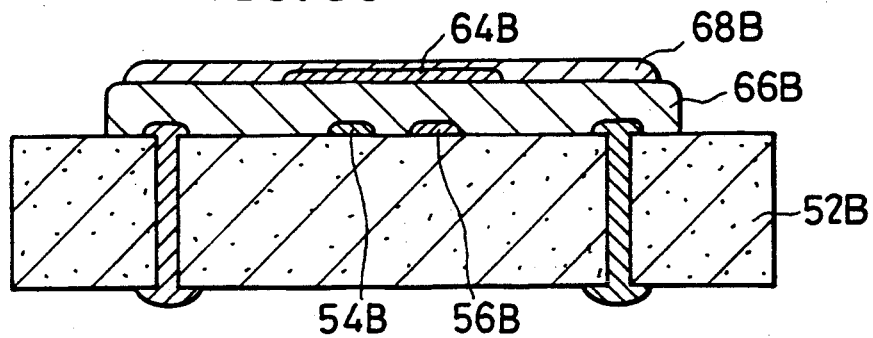

Other embodiments of the corona discharge device having different screen printed electrode patterns will be described with reference to FIGS. 27-30, wherein parts and members equivalent to those shown in FIGS. 4 and 5 are indicated by like reference numerals with suffixes A and B. These embodiments can be made in the same manner as the foregoing embodiment and only the differences will be described. Referring to FIGS. 27 and 28, in each of the inner electrodes 54A and 56A, the bridging portion connecting the inward portion and the terminal portion is offset from the outer floating electrode 64A. In addition, the outer electrode 64A superposed over the inner electrodes is so sized as to extend beyond the longitudinal length of the inward portion of each inner electrode. Similarly, in the embodiment shown in FIGS. 29 and 30, each of the inner electrode patterns 54B and 56B has a central recess over which the end of the outer floating electrode 64B extends. With these arrangements, corona discharge is generated only along those sections of the outer electrode contour which extend parallel and linearly, as shown by the hatched areas in FIGS. 27 and 29. This is advantageous in preventing columns of corona discharge from being concentrated on the ends of the outer electrode and, therefore, in avoiding premature damage of the outer electrode.

FIGS. 31-37 illustrate various arrangements of the corona discharge device which are specifically designed to reduce the operating voltage of the device, while fully retaining the advantage of the present invention. Also in these drawings, parts and members equivalent to those shown in FIGS. 4 and 5 are designated by like reference numerals with suffixes C, D and E.

Figure 31:
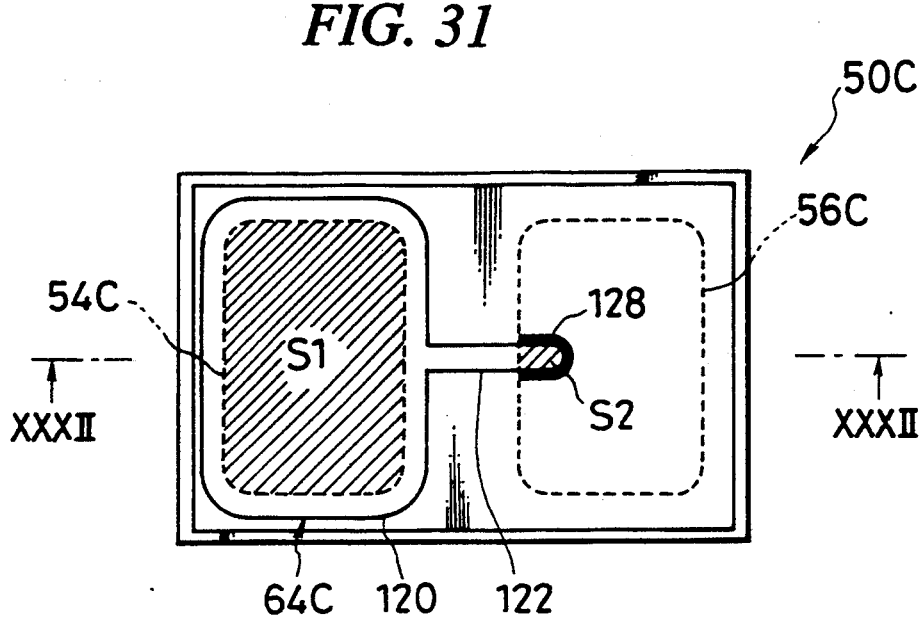
FIGS. 31–32 and 34–37 are schematic cross-sectional views showing various arrangements of the corona discharge device, with the cross-section of FIG. 31 being taken along the line XXXI—XXXI of FIG. 32, the cross-section of FIG. 32 taken along the line XXXII—XXXII of FIG. 31, the cross-section of FIG. 34 taken along the line XXXIV—XXXIV of FIG. 35, the cross-section of FIG. 35 taken along the line XXXV—XXXV of FIG. 34, the cross-section of FIG. 36 taken along the line XXXVI—XXXVI of FIG. 37, the cross-section of FIG. 37 taken along the line XXXVII-XXXVII of FIG. 36; and, FIG. 33 is an equivalent circuit diagram of the arrangement shown in FIGS. 31 and 32.
Figure 32:
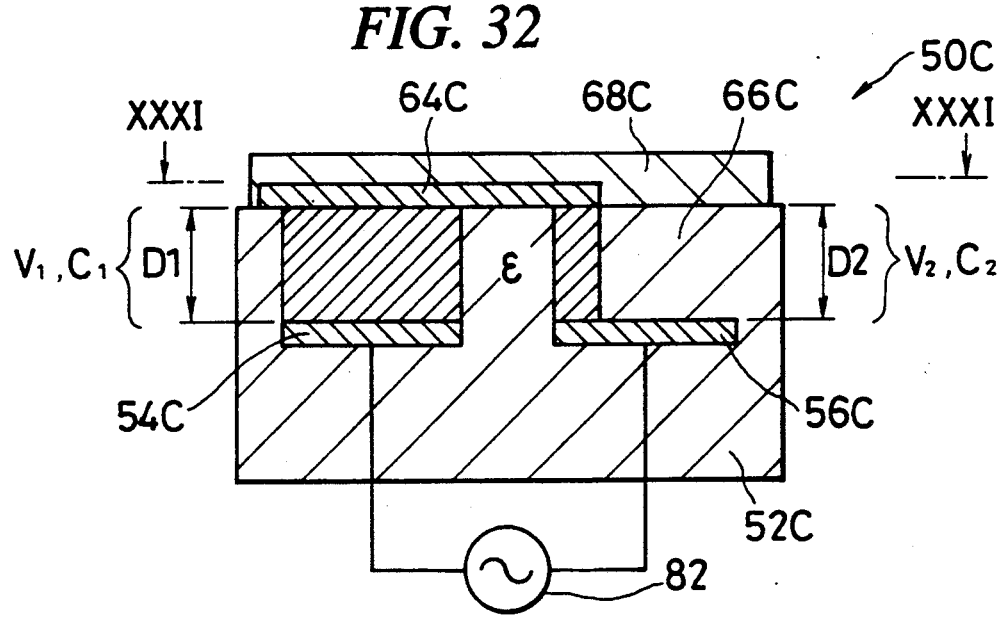
Figure 33:
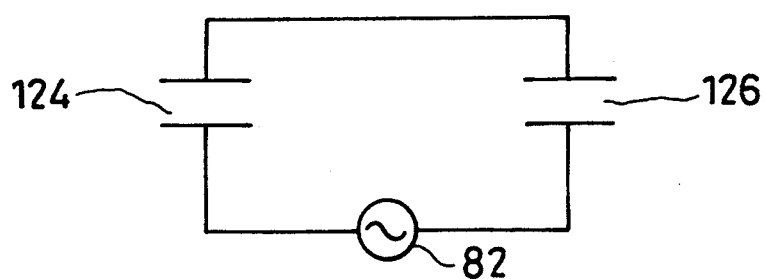

Referring to FIGS. 31 and 32, the inner electrodes 54C and 56C are rectangular in shape and have an equal surface area. The outer electrode 64C is comprised of a larger section 120 entirely overlapping the first inner electrode 54C and a smaller section 122 partly overlapping the second inner electrode 56C. When a voltage V is applied between the inner electrodes 54C and 56C from the power source 82, electrostatic capacitances $C_1$ and $C_2$ are established between the outer floating electrode 64C and the respective inner electrodes to equivalently form a pair of capacitors 124 and 126 as shown in the equivalent circuit diagram of FIG. 33. Since the capacitors 124 and 126 may be regarded as being connected in series by the outer electrode 64C, the voltage V is the sum of the potential difference $V_1$ across the first capacitor 124 and the potential difference $V_2$ across the second capacitor 126;

$$V = V_1 + V_2$$

Assuming the area of overlap between the first inner electrode 54C and the floating electrode 64C to be S1, the area of overlap between the second inner electrode 56C and the floating electrode 64C to be S2, the distance between the first inner electrode 54C and the floating electrode 64C to be D1, the distance between the second inner electrode 56C and the floating electrode 64C to be D2, and the dielectric constant of the dielectric layer 66C to be $\epsilon$, the capacitances $C_1$ and $C_2$ can be expressed as follows.

$$C1 = \epsilon \cdot \frac{S1}{D1}$$

$$C2 = \epsilon \cdot \frac{S2}{D2}$$

Generally, an electrostatic charge Q accumulated in a capacitor having a capacitance C is $Q=CV$. Therefore, the electrostatic charge Q1 and Q2 of the capacitors 124 and 126 may be expressed respectively as follows.

$$Q1 = \epsilon \cdot \frac{S1}{D1} \cdot V_1$$

$$Q2 = \epsilon \cdot \frac{S2}{D2} \cdot V_2$$

Since the capacitors 124 and 126 are electrically connected with each other by the outer electrode 64C, $Q1=Q2$. Therefore, $$\epsilon \cdot \frac{S1}{D1} \cdot V_1 = \epsilon \cdot \frac{S2}{D2} \cdot V_2 \tag{4}$$

Since $D1=D2$, and assuming that $K=S1/S2$, equation (4) may be rewritten as follows.

$$k \cdot V_1 = V_2 \tag{5}$$

As $V=V_1+V_2$, $V_1=V-V_2$. By substituting $V_1=V-V_2$ for $V_1$ in equation (5), $$K \cdot (V-V_2) = V_2$$

Therefore, $$V_2 = \frac{1}{1 + 1/K} \cdot V \tag{6}$$

If the the areas of overlap S1 is designed to be ten times larger than S2 so that $K=10$, then, $V_2$ is approximately equal to 0.9 V.

Accordingly, in contrast to the corona discharge device of FIGS. 4 and 5 wherein the electrostatic capacitance between a first pair of electrodes 54 and 64 is equal to the capacitance between a second pair of electrodes 56 and 64 so that the applied voltage V is divided and equally distributed between the two pairs of electrodes, the corona discharge device shown in FIGS. 31 and 32 can be operated at a much lower voltage to produce corona discharge between the smaller section 122 of the outer electrode 64C and the second inner electrode 56C, as shown by the bold line 128 in FIG. 31.

Figure 34:
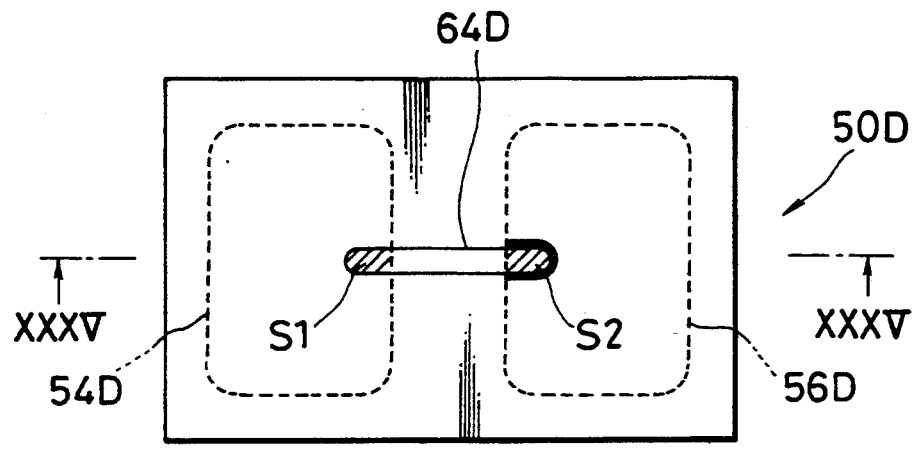
Figure 35:
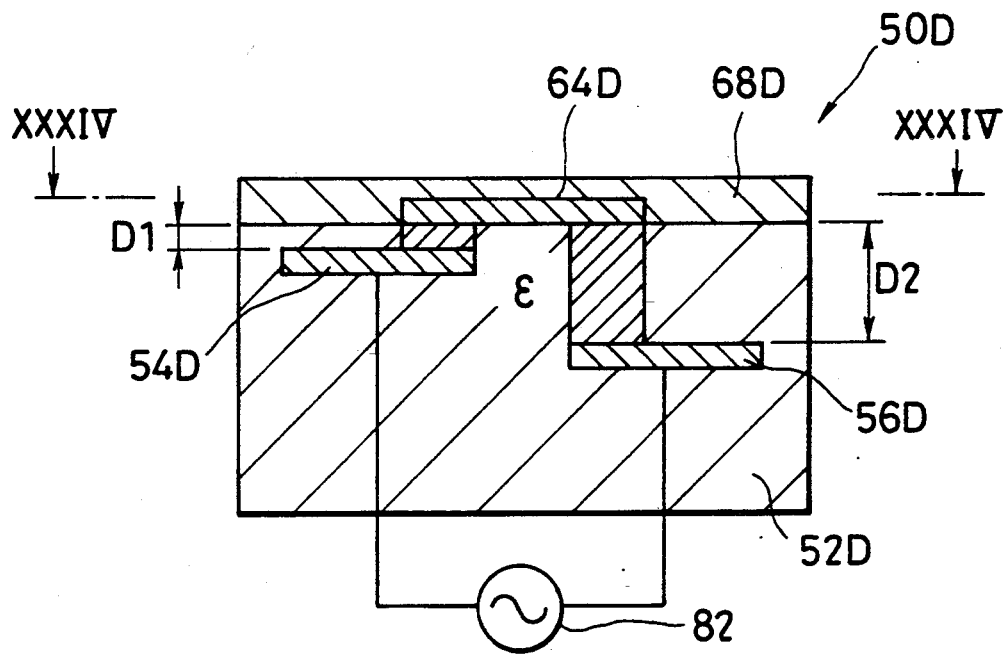

FIGS. 34 and 35 illustrate another arrangement wherein the areas of overlap S1 and S2 are equal but the distance D1 between the first inner electrode 54D and the outer floating electrode 64D is much smaller than the distance D2 between the second inner electrode 56D and the outer electrode 64D. Since $S1=S2$, following equation is obtained from equation (4).

$$V_2 = \frac{1}{1 + D1/D2} \cdot V \tag{7}$$

If D1 and D2 are selected such that D1/D2 is 0.3, then, $$V_2 = \frac{1}{1 + 0.3} \cdot V = 0.77 \cdot V$$

As a result, the voltage applied between the second inner electrode 56D and the outer electrode 64D approximates to the voltage V of the power source 82. Therefore, the corona discharge device 50D shown in FIGS. 34 and 35 can be operated to develop corona discharge only between the second inner electrode 56D and the outer electrode 64D at a voltage lower than that required in the device of FIGS. 4 and 5.

Figure 36:
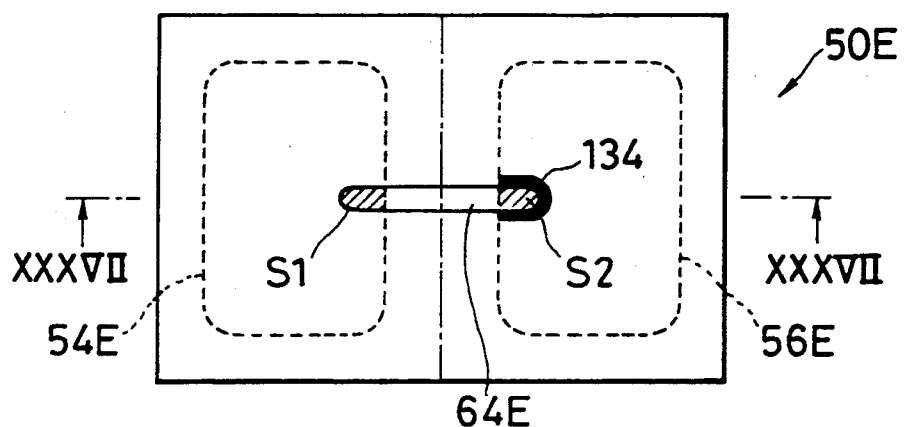
Figure 37:
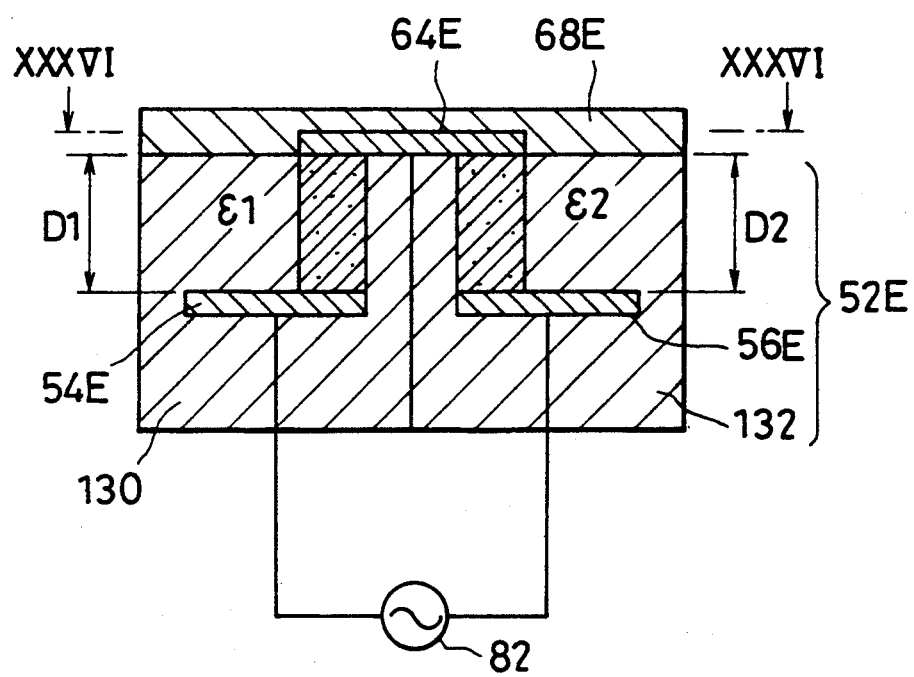

Referring to FIGS. 36 and 37, the arrangement shown therein is characterized in that the capacitances of the two pairs of electrodes are made differently by using dielectric materials having different dielectric constant. For example, the left-hand half 130 of the dielectric substrate 52E is made from titanate ceramics having a dielectric constant $\epsilon 1$ of 15-1000, with the right-hand half 132 of the substrate being made from alumina ceramics having a dielectric constant $\epsilon 2$ of 8-10. With this arrangement, equation (4) can be rewritten as follows.

$$\epsilon_1 \cdot \frac{S1}{D1} \cdot V_1 = \epsilon_2 \cdot \frac{S2}{D2} \cdot V_2 \tag{8}$$

Since $D1=D2$ and $S1=S2$, following equation is derived from equation (8).

$$V_2 = \frac{1}{1 + \epsilon_2/\epsilon_1} \cdot V \tag{9}$$

Assuming that the dielectric materials are selected such that $\epsilon 1=100$ and $\epsilon 2=10$ so that $\epsilon_2/\epsilon_1=0.1$, then, $$V_2 = \frac{1}{1 + 0.1} \cdot V = 0.9 \cdot V$$

Therefore, the voltage applied between the second inner electrode 56E and the outer electrode 64E approaches to the voltage V of the power source 82. Accordingly, by applying a voltage much lower than that required in the device of FIGS. 4 and 5, the corona discharge device 50E may be operated to develop corona discharge between the second inner electrode 56E and the outer electrode 64E, as shown by bold line 134 in FIG. 36.

It is claimed:

1. A method of manufacturing a corona discharge device for use as ozonizer, comprising the steps of:
    preparing a foreproduct of corona discharge device, said foreproduct having spaced first and second planar electrodes embedded in a substrate of dielectric material, terminal means connected to said first and second electrodes for applying a high frequency alternating voltage therebetween, a third electrode disposed on said substrate in a spaced, parallel, at least partly superposing relationship with respect to said first and second electrodes, and a protective layer of chemically-resistive electrically-insulating material covering said third electrode, said first and second electrodes being laterally spaced apart from each other at a distance greater than a least distance between said first and second electrodes and said third electrode; and,
    aging said protective layer of said foreproduct for a predetermined period of time to obtain a final product of corona discharge device by applying between said first and second electrodes thereof a high frequency alternating voltage having a voltage level higher than an initial minimum flashover voltage level of said foreproduct.

2. A method of manufacturing a corona discharge device according to claim 1, wherein said step of aging is carried out at a voltage slightly lower than a breakdown voltage of a layer of said dielectric material located between said first and second electrodes and said third electrode.

3. A method of manufacturing a corona discharge device according to claim 1, wherein said step of aging is carried out for at least about 5 seconds.

4. A method of manufacturing a corona discharge device according to claim 1, wherein said substrate is made of alumina ceramics comprising about 90–94% by weight of $Al_2O_3$, about 4–8% by weight of $SiO_2$, about 0.9–1.1% by weight of CaO, and about 0.5–0.9% by weight of MgO.

5. A method of manufacturing a corona discharge device according to claim 1, wherein said first and second electrodes are coplanar and wherein said step of aging is carried out for such time and at such voltage that the initial minimum flashover voltage of said final product becomes to satisfy the equation:

$$U_i = 0.03(D + 2d) + 2.2$$

wherein
$U_i$ is the initial minimum flashover voltage, in $kV_{pp}$, of said final product,
D is the effective thickness, in micrometers, of a layer of said dielectric material situated between said first and second electrodes and said third electrode, and,
d is the effective thickness, in micrometers, of said protective layer.

6. A method of manufacturing a corona discharge device according to claim 1, wherein said first and second electrodes are coplanar and wherein the effective thickness of a layer of said dielectric material situated between said first and second electrodes and said third electrode and the effective thickness of said protective layer are selected to satisfy the relationship:

$$V_o > 0.03(D^\circ 2d) + 2.2$$

wherein
$V_o$ is the normal operating voltage, in $kV_{pp}$, of said corona discharge device,
D is the effective thickness, in micrometers, of a layer of said dielectric material situated between said first and second electrodes and said third electrode, and,
d is the effective thickness, in micrometers, of said protective layer.

7. A method of manufacturing a corona discharge device according to claim 1, wherein the effective thickness of a layer of said dielectric material situated between said first and second electrodes and said third electrode is selected to be about 25–70 micrometers and the effective thickness of said protective layer is selected to be about 7–20 micrometers so that said final product is operated at an operating voltage equal to or less than about 6 $kV_{pp}$.

8. A method of manufacturing a corona discharge device according to claim 1, wherein said third electrode is configured to present round corners to avoid concentration of corona discharge columns.

9. A method of manufacturing a corona discharge device according to claim 1, wherein said third electrode has such a length as to extend beyond the contour of at least one of said first and second electrodes so that corona discharge is generated between said one of electrodes and said third electrode only along linear portions of the contour of said third electrode.

10. A method of manufacturing a corona discharge device according to claim 1, wherein said device is designed and constructed such that the electrostatic capacitance established between said first and third electrodes is different from that established between said second and third electrodes.

11. A method of manufacturing a corona discharge device according to claim 10, wherein the area (S1) in which said third electrode is superposed upon one of said first and second electrodes is greater than the area (S2) in which said third electrode is superposed on the other of said first and second electrodes.

12. A method of manufacturing a corona discharge device according to claim 10, wherein the distance (D1) between said first and third electrodes is different from the distance (D2) between said second and third electrodes.

13. A method of manufacturing a corona discharge device according to claim 10, wherein the dielectric constant of a layer of said dielectric material situated between said first and third electrodes is different from that of a layer of said dielectric material situated between said second and third electrodes.

14. A method of manufacturing a corona discharge device comprising the steps of:
preparing a foreproduct of corona discharge device having first and second planar electrodes embedded in a substrate of dielectric material in a laterally-spaced coplanar relationship with each other, terminal means connected to said first and second electrodes for applying a high frequency alternating voltage therebetween, a third floating electrode disposed on said substrate and capacitively coupled to but spaced from said first and second electrodes, and a protective layer of chemically-resistive electrically-insulatingmaterial covering said third electrode, said foreproduct originally having an initial minimum flashover voltage level at which corona discharge would be generated almost instantaneously upon application of a high frequency alternating voltage; and,
applying for a predetermined time between said first and second electrodes of said foreproduct a high frequency alternating voltage having a voltage level higher than said initial minimum flashover voltage level of said foreproduct thereby causing corona discharge to be developed over said protective layer to age said protective layer, whereby a final product of corona discharge device having an effective operating voltage level lower than said initial minimum flashover voltage level is obtained.

15. A method of manufacturing a corona discharge device comprising the steps of:
preparing a green sheet of ceramic-forming dielectric material;
forming a pair of spaced through holes across said green sheet;
filling said holes with a paste containing metallic particles to form a pair of spaced electric terminal patterns;
forming a pair of spaced electrode patterns of said paste on a surface of said green sheet in contact, respectively, with said terminal patterns;
forming a layer of ceramic-forming dielectric material over said electrode patterns;
forming another electrode pattern of said paste on said layer of ceramic-forming dielectric material in an at least partly superposing relationship with respect to said spaced electrode patterns;

coating said another electrode pattern with a protective layer of chemically-resistive electrically-insulating material;

sintering the thus formed product to obtain a foreproduct of corona discharge device; and, causing said foreproduct to generate corona discharge until said protective layer is aged.

* * * * *